United States Patent
Sakaguchi

(10) Patent No.: US 6,614,564 B1
(45) Date of Patent: Sep. 2, 2003

(54) IMAGE READING DEVICE, IMAGE READING METHOD, AND IMAGE FORMING SYSTEM

(75) Inventor: Yasunobu Sakaguchi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

(21) Appl. No.: 09/389,589

(22) Filed: Sep. 3, 1999

(30) Foreign Application Priority Data

Sep. 9, 1998 (JP) .......................................... 10-255596

(51) Int. Cl.[7] ................................................ H04N 1/04
(52) U.S. Cl. ...................... 358/487; 358/486; 358/475; 358/483; 358/506; 358/509
(58) Field of Search ................................ 358/486, 487, 358/475, 505, 509, 506, 296, 298, 527, 520, 522, 521, 483; 355/82, 40, 41; 347/115

(56) References Cited

U.S. PATENT DOCUMENTS

| 5,369,426 A | * | 11/1994 | Jamzadeh | 347/115 |
|---|---|---|---|---|
| 5,568,270 A | * | 10/1996 | Endo | 358/298 |
| 5,684,601 A | * | 11/1997 | Endo | 358/298 |
| 5,850,298 A | * | 12/1998 | Narahara et al. | 358/518 |
| 5,991,010 A | * | 11/1999 | Nishio | 355/82 |
| 6,278,512 B1 | * | 8/2001 | Tsuji | 355/40 |

* cited by examiner

*Primary Examiner*—Cheukfan Lee
(74) *Attorney, Agent, or Firm*—Sughrue Mion, PLLC

(57) ABSTRACT

A verification screen is displayed by using information obtained by prescanning. On the basis of a print magnification, fine scanning conditions are computed, and a determination is made as to whether or not a density of an image obtained by prescanning is greater than or equal to a predetermined value. If the density of the image obtained by prescanning is not greater than or equal to the predetermined value, fine scanning is carried out in accordance with fine scan conditions. If the density of the image obtained by prescanning is greater than or equal to the predetermined value, the image is read at a charge accumulating time which is longer than a charge accumulating time during fine scanning and at a conveying speed which is slower than a conveying speed during fine scanning.

26 Claims, 21 Drawing Sheets

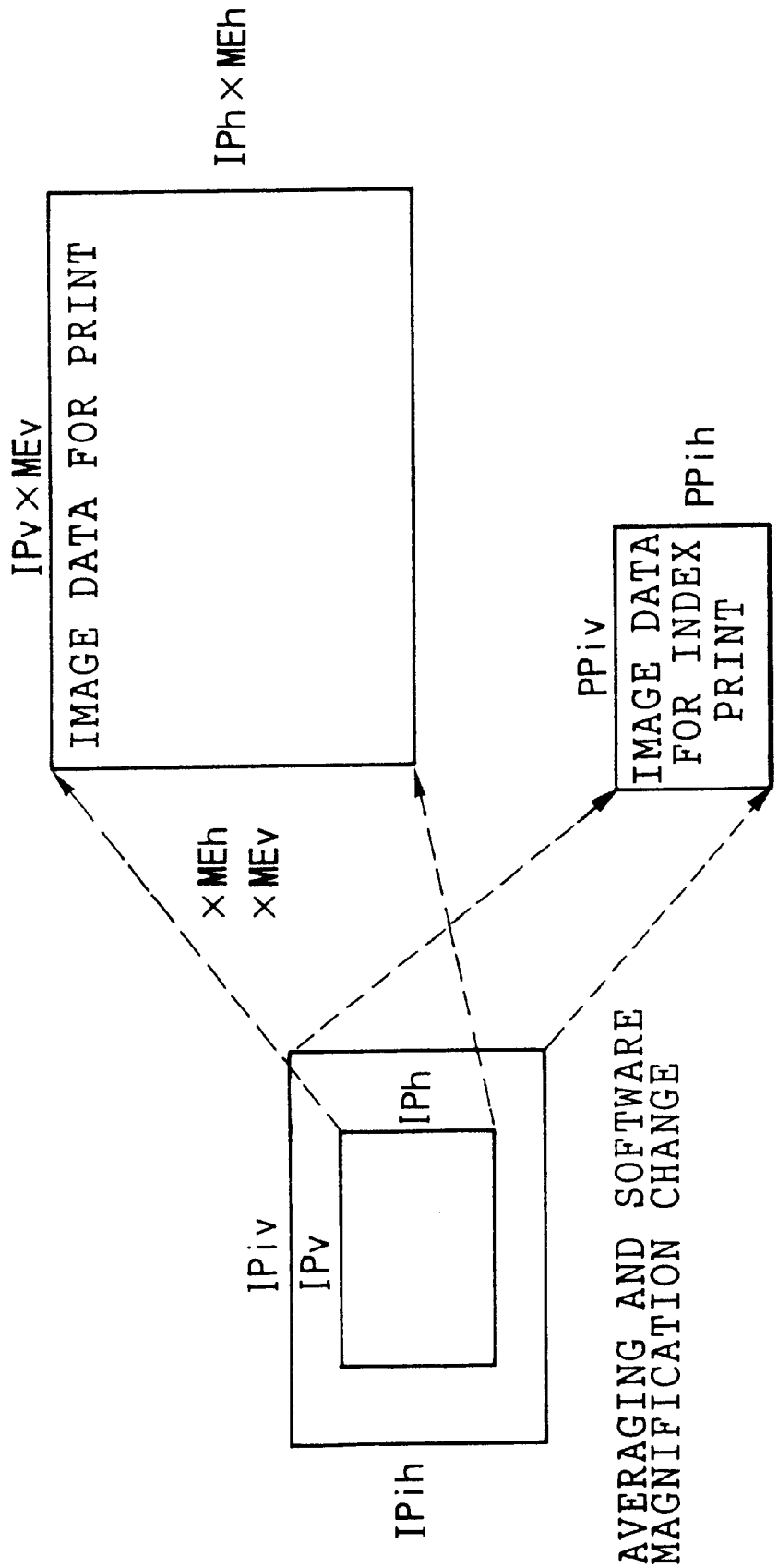

(IMAGE FORMING SYSTEM)

IMAGE READING DEVICE, IMAGE READING METHOD, AND IMAGE FORMING SYSTEM

BACKGROUND OF THE INVENTION

1. Field of the Invention

The present invention relates to an image reading device, and in particular, to an image reading device in which a photographic photosensitive material on which an image is recorded is conveyed at a predetermined conveying speed, and the image of the photographic photosensitive material being conveyed is read for a predetermined reading time.

2. Description of the Related Art

Conventional image reading devices are known in which an image recorded on a photographic film is preliminarily read, and on the basis of the information obtained by the preliminary reading, e.g., on the basis of the density of the image, reading conditions for main reading of that image are computed, and main reading of the image is carried out in accordance with the computed reading conditions. Because the reading conditions are computed on the basis of the image density or the like, good reading conditions which correspond to the density of the image can be computed.

When the density of an image is a predetermined value or greater, the light source diaphragm, which is one of the reading conditions, is made as close to a maximum as possible. However, even if the light source diaphragm is made to be a maximum, if the density of the image is a predetermined value or greater, the conveying speed will be too fast or the reading time will be too short. Thus, the image cannot be read properly.

SUMMARY OF THE INVENTION

In view of the aforementioned, an object of the present invention is to provide an image reading device which can read an image well even if the density of the image is a predetermined value or more.

In order to achieve the above-described object, the present invention provides an image reading device comprising: a conveying device able to convey a photographic photosensitive material, on which an image is recorded, at a first conveying speed and a second conveying speed which is slower than the first conveying speed; a reading device able to read the image of the photographic photosensitive material, which is conveyed by the conveying device, for a first reading period of time and a second reading period of time which is longer than the first reading period of time; reading determining means for determining whether or not the image can be read properly, on the basis of a density of the image at the time the image of the photographic photosensitive material conveyed by the conveying device at the first conveying speed is read by the reading device for the first reading period of time; and a control device for, in a case in which the reading determining means determines that the image cannot be read properly, carrying out at least one of a first control, in which the conveying device is controlled to convey the photographic photosensitive material at the second conveying speed, and a second control, in which the reading device is controlled to read the image of the photographic photosensitive material for the second reading period of time.

The conveying device can convey the photographic photosensitive material, on which the image is recorded, at the first conveying speed and at the second conveying speed which is slower than the first conveying speed.

The reading device can read the image on the photographic photosensitive material, which is conveyed by the conveying device, at a first reading period of time and a second reading period of time which is longer than the first reading period of time.

The reading determining means determines whether or not the image can be read properly, on the basis of a density of the image at the time the image of the photographic photosensitive material conveyed by the conveying device at the first conveying speed is read by the reading device for the first reading period of time.

If the reading determining means determines that the image cannot be read properly, the image density is high, and thus the first conveying speed will be too fast, or the first reading period of time will be too short. Thus, in this case, the control device carries out at least one of a first control, in which the conveying device is controlled to convey the photographic photosensitive material at the second conveying speed, and a second control, in which the reading device is controlled to read the image of the photographic photosensitive material for the second reading period of time.

In this way, if the density of the image, at the time the image of the photographic photosensitive material conveyed at the first conveying speed is read for the first reading period of time, is high, the photographic photosensitive material is conveyed at the second conveying speed and/or the image of the photographic photosensitive material is read at the second reading period of time. Thus, even if the density of the image is greater than or equal to a predetermined value, the image can be read well.

Further, the second conveying speed is determined on the basis of the density of the image at the time the image of the photographic photosensitive material conveyed at the first conveying speed is read for the first reading period of time, and the second reading period of time is determined on the basis of the second conveying speed.

Moreover, in a case in which the reading determining means determines that the image can be read properly, on the basis of the density of the image at the time the image of the photographic photosensitive material conveyed at the first conveying speed is read for the first reading period of time, the control device may control the conveying device and the reading device such that the image of the photographic photosensitive material is subjected to a main reading.

A second invention is an image reading device comprising: a conveying device for conveying a photographic photosensitive material on which an image is recorded; a reading device for reading the image of the photographic photosensitive material conveyed by the conveying device; determining means for determining a conveying speed at which the image can be read properly, on the basis of a density of the image of the photographic photosensitive material conveyed by the conveying device at the time the image is read by the reading device; and a control device for controlling the conveying device such that the photographic photosensitive material is conveyed at the conveying speed determined by the determining means.

Namely, the conveying device conveys the photographic photosensitive material on which the image is recorded, and the reading device reads the image of the photographic photosensitive material conveyed by the conveying device.

On the basis of the density of the image at the time the image of the photographic photosensitive material conveyed by the conveying device is read by the reading device, the determining means determines a conveying speed at which the image can be read properly.

The control device controls the conveying device such that the photographic photosensitive material is conveyed at the conveying speed determined by the determining means.

In this way, on the basis of the density of the image, a conveying speed at which the image can be properly read is determined, and the photographic photosensitive material is conveyed at the determined conveying speed. Therefore, even if the density of the image is greater than or equal to a predetermined value, the image can be read properly.

The image reading device of the second invention may be structured such that the conveying device is able to convey the photographic photosensitive material at a first conveying speed and a second conveying speed, the reading device is able to read the image of the photographic photosensitive material for a first reading period of time and a second reading period of time, and on the basis of a density of the image at the time the image of the photographic photosensitive material conveyed by the conveying device at the first conveying speed is read by the reading device for the first reading period of time, the determining means determines whether or not the image can be read properly, and in a case in which the determining means determines that the image cannot be read properly, the determining means determines the second conveying speed to be the conveying speed at which the image can be read properly.

The second conveying speed is determined on the basis of the density of the image at the time the image of the photographic photosensitive material conveyed by the conveying device at the first conveying speed is read by the reading device for the first reading period of time.

The image reading device of the second invention may be structured so as to further comprise an illuminating device for illuminating light onto the photographic photosensitive material, wherein the determining means determines an amount of light which is different than (e.g., either greater than or less than) an amount of light illuminated onto the photographic photosensitive material by the illuminating device at the time the density of the image is determined, and on the basis of the amount of light determined by the determining means, the determining means determines the conveying speed at which the image can be read properly, and the control device controls the illuminating device such that the amount of light determined by the determining means is illuminated onto the photographic photosensitive material, and the control device controls the conveying device such that the photographic photosensitive material is conveyed at a conveying speed which is determined on the basis of the amount of light determined by the determining means.

In this way, an amount of light, which is different than the amount of light illuminated onto the photographic photosensitive material at the time the density of the image is determined, is determined. On the basis of this determined amount of light, a conveying speed at which the image can be read properly is determined. The determined amount of light is illuminated onto the photographic photosensitive material, and the photographic photosensitive material is conveyed at a conveying speed determined on the basis of the determined amount of light. Therefore, for example, in a case in which an amount of light, which is greater than the amount of light illuminated onto the photographic photosensitive material at the time the density of the image is determined, is determined, even if the density of the image is a predetermined value or more, the image can be read properly, the conveying speed can be made relatively fast, and the processing time can be shortened.

A third invention is an image reading device comprising: a conveying device for conveying a photographic photosensitive material on which an image is recorded; a reading device for reading the image of the photographic photosensitive material conveyed by the conveying device; determining means for determining a reading period of time of the reading device at which the image can be read properly, on the basis of a density of the image of the photographic photosensitive material conveyed by the conveying device at the time the image is read by the reading device; and a control device for controlling the reading device such that the image of the photographic photosensitive material is read for the reading period of time determined by the determining means.

The conveying device conveys a photographic photosensitive material on which an image is recorded, and the reading device reads the image of the photographic photosensitive material conveyed by the conveying device.

The determining means determines a reading period of time of the reading device at which the image can be read properly, on the basis of the density of the image when the image of the photographic photosensitive material conveyed by the conveying device is read by the reading device.

The control device controls the reading device such that the image of the photographic photosensitive material is read for the reading period of time determined by the determining means.

In this way, on the basis of the density of the image, the reading period of time of the reading device at which the image can be properly read is determined, and the image of the photographic photosensitive material is read for the determined reading period of time. Therefore, even if the density of the image is greater than or equal to a predetermined value, the image can be read properly.

The third invention may be structured such that, on the basis of the density of the image, the determining means also determines a conveying speed of the photographic photosensitive material, and the control device also controls the conveying device such that the photographic photosensitive material is conveyed at the conveying speed determined by the determining means.

Further, the third invention may be structured so as to further comprise an illuminating device for illuminating light onto the photographic photosensitive material, wherein the determining means determines an amount of light which is different than (e.g., either greater than or less than) an amount of light illuminated onto the photographic photosensitive material by the illuminating device at the time the density of the image is determined, and on the basis of the amount of light determined by the determining means, the determining means determines a reading period of time of the reading device at which the image can be read properly, and the control device controls the illuminating device such that the amount of light determined by the determining means is illuminated onto the photographic photosensitive material, and the control device controls the reading device such that the image of the photographic photosensitive material is read for a reading period of time which is determined on the basis of the amount of light determined by the determining means. In this case, on the basis of the determined amount of light, the determining means determines the conveying speed and the reading period of time of the reading device for proper reading of the image. The control device controls the illuminating device such that the amount of light determined by the determining means is illuminated onto the photographic photosensitive material.

Further, the control device controls the reading device such that the image of the photographic photosensitive material is read for the reading period of time determined on the basis of the determined amount of light. The control device also controls the conveying device such that the photographic photosensitive material is conveyed at the conveying speed determined on the basis of the determined amount of light.

The third invention may be structured such that the conveying device is able to convey the photographic photosensitive material at a first conveying speed and a second conveying speed; the reading device is able to read the image of the photographic photosensitive material for a first reading period of time and a second reading period of time; and on the basis of a density of the image at the time the image of the photographic photosensitive material conveyed by the conveying device at the first conveying speed is read by the reading device for the first reading period of time, the determining means determines whether or not the image can be read properly, and in a case in which the determining means determines that the image cannot be read properly, the determining means determines the second reading period of time to be the reading period of time at which the image can be read properly.

The second reading period of time is determined on the basis of the second conveying speed.

BRIEF DESCRIPTION OF THE DRAWINGS

FIG. 18 is a view for explaining a region to be scanned which is changed in accordance with trimming and the like.

FIG. 24 is a schematic view of image data of an index print.

DESCRIPTION OF THE PREFERRED EMBODIMENTS

Embodiments of the present invention will be described in detail hereinafter with reference to the accompanying drawings.

Figure 1:
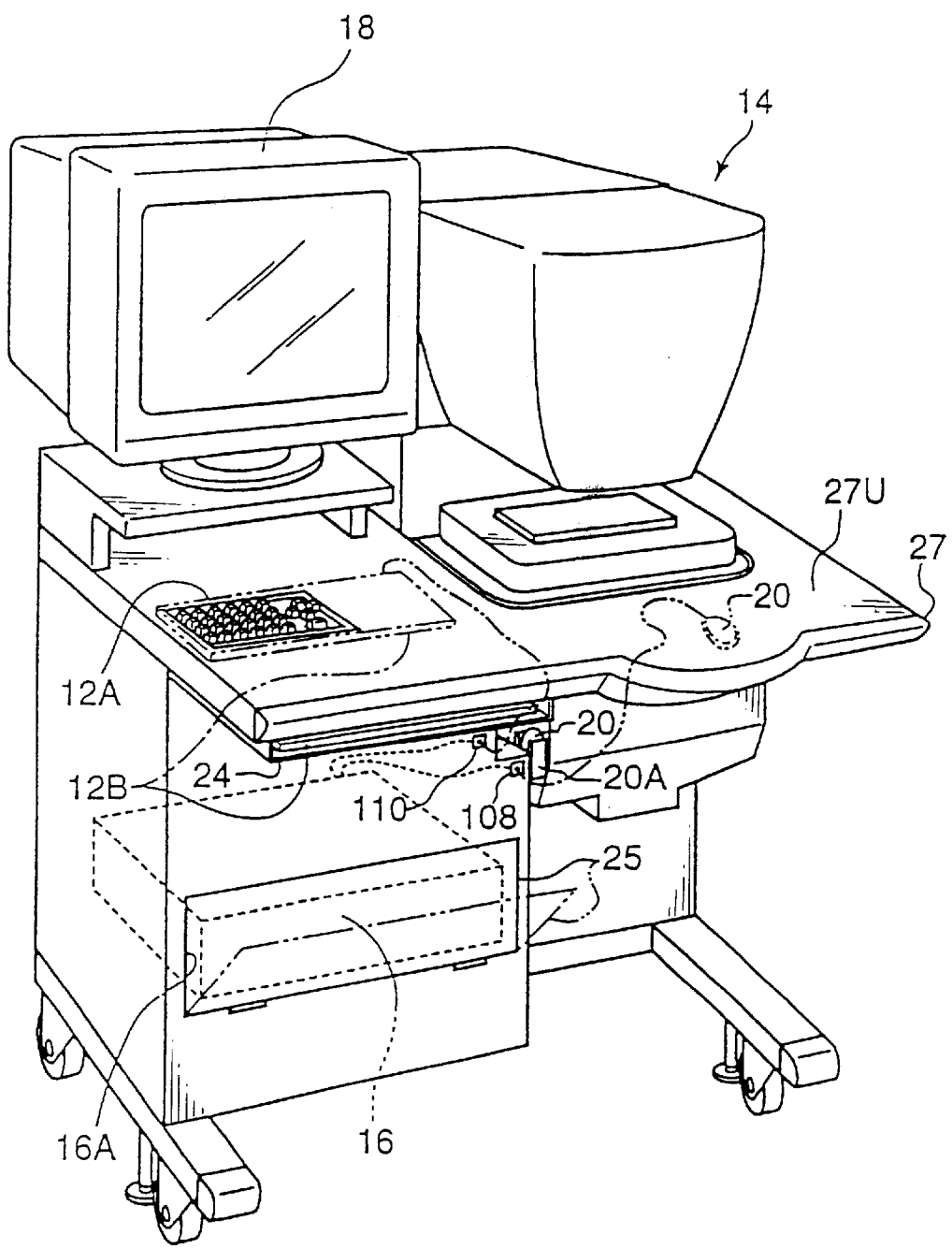
FIG. 1 is a view of the exterior of a line CCD scanner

As illustrated in FIG. 1, a line CCD scanner (image reading device) 14 relating to the present embodiment is provided at a work table 27 at which are also provided an image processing section 16, a mouse 20, two keyboards 12A, 12B, and a display 18.

One of the keyboards 12A is embedded in a work surface 27U of the work table 27. The other keyboard 12B is stored in a drawer 24 of the work table 27 when not being used, and is removed from the drawer 24 and placed on top of the other keyboard 12A when used. At this time, the cord of the keyboard 12B is connected to a jack 110 connected to the image processing section 16.

The cord of the mouse 20 is connected to the image processing section 16 via a hole 108 formed in the work table 27. The mouse 20 is stored in a mouse holder 20A when not in use, and is removed from the mouse holder 20A and placed on the work surface 27U when used.

The image processing section 16 is accommodated in an accommodation portion 16A provided at the work table 27, and is closed therein by a door 25. When the door 25 is opened, the image processing section 16 can be removed from the accommodation portion 16A.

The line CCD scanner 14 reads a frame image recorded on a photographic photosensitive material, e.g., a photographic film such as a negative film, a reversal film, or the like. For example, the line CCD scanner 14 may read the film image of a 135 size photographic film, a 110 size photographic film, a photographic film on which a transparent magnetic layer is formed (a 240 size photographic film which is known as an APS film), and 120 size and 220 size (brownie size) photographic films. The line CCD scanner 14 reads, by a line CCD, the film image which is to be read, and outputs the image data.

The "photographic film" in the present invention is a film in which, after an object has been photographed, developing processing of the film is carried out so that a negative image or a positive image is made visible.

Image data outputted from the line CCD scanner 14 is inputted to the image processing section 16 where image processings such as various types of correction are carried out on the inputted image data, and the processed data is outputted to a laser printer section (not shown) as image data for recording.

Figure 2:
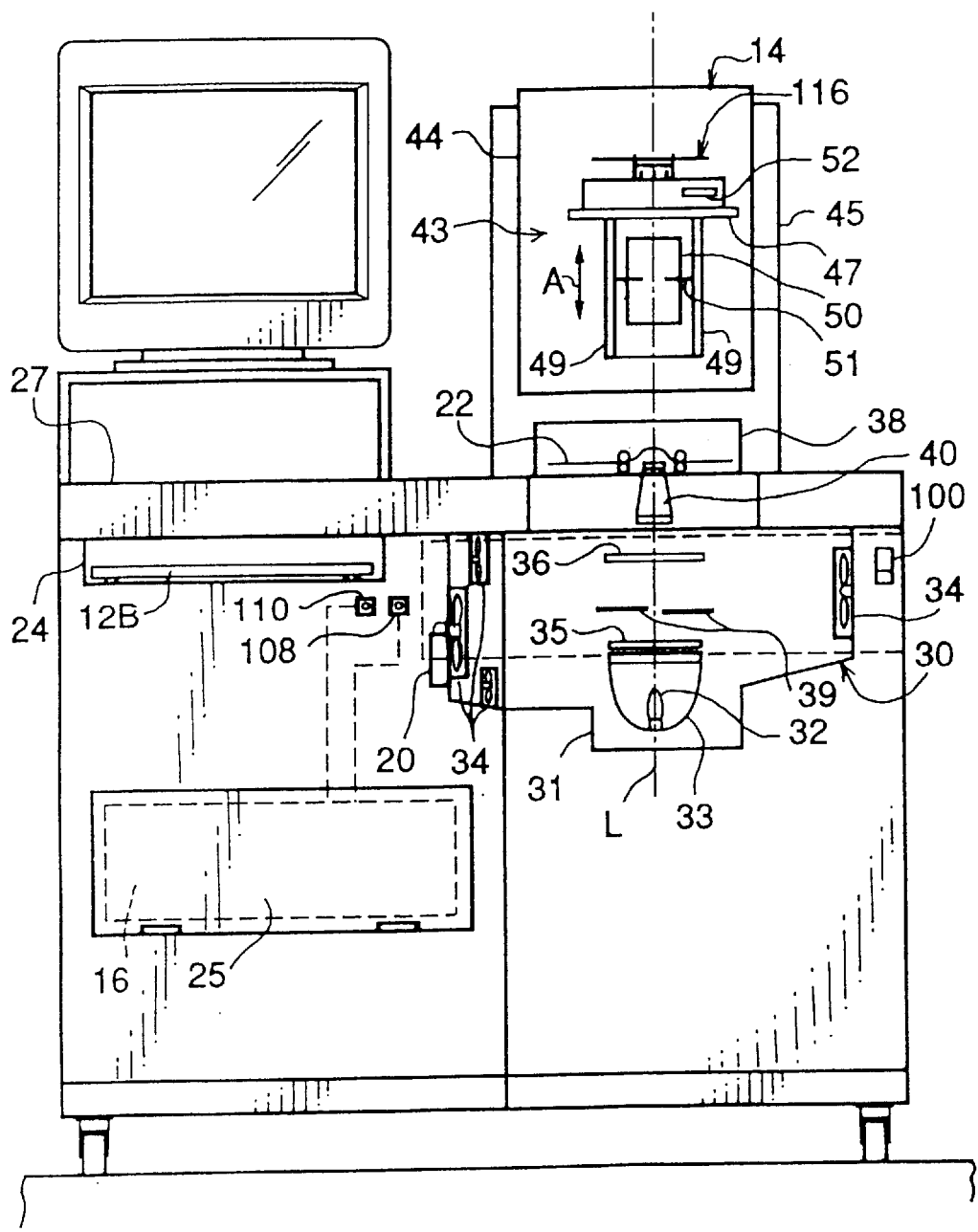
FIG. 2 is a front sectional view of an optical system of the line CCD scanner.
Figure 3:
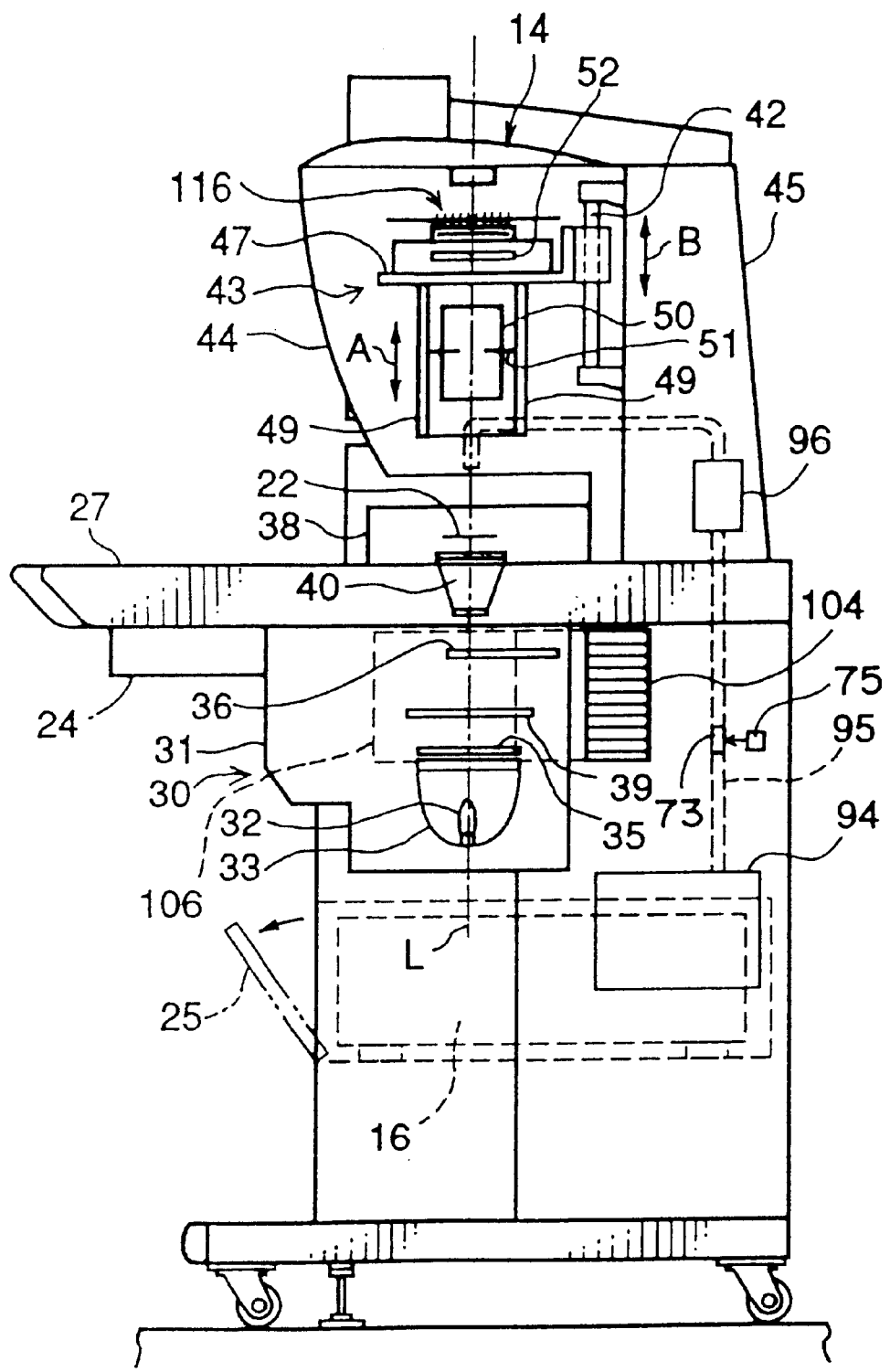
FIG. 3 is a side sectional view of the optical system of the line CCD scanner.

As shown in FIGS. 2 and 3, the optical system of the line CCD scanner 14 is provided with a light source section 30 which is disposed below the work table 27, a diffusion box 40 which is supported at the work table 27, a film carrier 38 which is set at the work table 27, and a reading section 43 which is disposed at the side of the work table 27 opposite the side at which the light source section 30 is disposed.

The light source section 30 is housed in a metal casing 31. A lamp 32, which is a halogen lamp, a metal halide lamp, or the like, is disposed within the casing 31.

A reflector 33 is provided at the periphery of the lamp 32. A portion of the light emitted from the lamp 32 is reflected by the reflector 33, so as to be reflected off in a given direction. Plural fans 34 are provided at the sides of the reflector 33. The fans 34 are operated while the lamp 32 is lit, so as to prevent the interior of the casing 31 from overheating.

A UV/IR cutting filter 35, a diaphragm 39, and a turret 36 are disposed along the optical axis L of the light reflected from the reflector 33 in that order at the side of the reflector 33 from which light is reflected. By cutting light of wavelengths of ultraviolet and infrared regions, the UV/IR cutting filter 35 improves reading accuracy by preventing an increase in temperature of the photographic film 22. The diaphragm 39 adjusts the amount of the light from the lamp 32 and the amount of light reflected by the reflector 33. A balance filter 36N for negative films and a balance filter 36P for reversal films are fit into the turret 36 (see FIG. 4B). The balance filter 36N and the balance filter 36P appropriately set, in accordance with the type of photographic film (negative film/reversal film), the color components of the light which reaches the digital film 22 and the reading section 43.

Figure 4A:
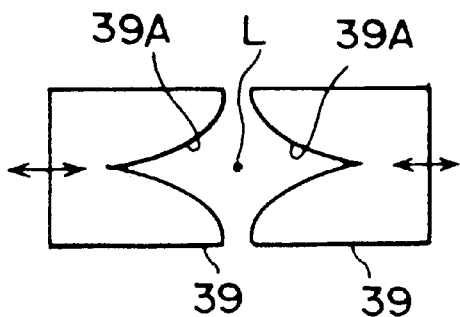
FIG. 4A is a plan view illustrating an example of a diaphragm.

The diaphragm 39 is formed from a pair of plate-like members disposed on either side of the optical axis L and constructed so as to be able to slide both toward and away from each other. As shown in FIG. 4A, a cutout portion 39A is formed in an end section of each of the pair of plate-like members of the diaphragm 39, so that the cross-sectional surface area along a direction perpendicular to the sliding direction changes continuously from one sliding direction end of the plate-like member to the other sliding direction end thereof. The plate-like members are disposed so that the sides in which the cutout portions 39A are formed face each other.

In the above structure, either of the filters (36N, 36P) corresponding to the types of the photographic films is positioned on the optical axis L so as to obtain the desired light components. The light passing through the diaphragm 39 is adjusted to a desired light amount by the position of the diaphragm 39.

The diffusion box 40 is formed such that the length thereof along the conveying direction of the photographic film 22 conveyed by the film carrier 28 decreases toward the top portion of the diffusion box 40, i.e., decreases along the direction of approaching the photographic film 22 (see FIG. 2), and such that the length of the diffusion box 40 in the direction orthogonal to the conveying direction of the photographic film 22 (i.e., the length along the transverse direction of the photographic film 22) increases toward the top portion of the diffusion box 40, i.e., increases along the direction of approaching the photographic film 22 (see FIG. 3). Further, light diffusing plates (not shown) are mounted to both the light entering side and the light exiting side of the diffusion box 40. The above-described diffusion box 40 is used for a 135 size photographic film. Other diffusion boxes (not shown) of configurations corresponding to other types of photographic films may also be readied for use.

The light which enters the diffusion box 40 is directed toward the film carrier 38 (i.e., toward the photographic film 22), is made into slit light whose longitudinal direction is the transverse direction of the photographic film 22, is made into diffused light by the light diffusing plates, and exits from the diffusion box 40. In this way, by making the light which exits from the diffusion box 40 diffused light, there is less unevenness of the amount of light illuminated onto the photographic film 22, slit light of a uniform amount of light is illuminated onto the film image, and even if the film image is scratched, the scratches are difficult to notice.

A film carrier 38 and diffusion box 40 are readied for each type of photographic film 22, and are selected in accordance with the type of photographic film 22.

A long, thin hole (not shown), whose length along the transverse direction of the photographic film 22 is wider than the width of the photographic film 22, is provided in each of the top surface and the bottom surface of the film carrier 38 at positions corresponding to the optical axis L. The slit light from the diffusion box 40 is illuminated onto the photographic film 22 via the hole in the bottom surface of the film carrier 38. The light which has passed through the photographic film 22 passes through the hole in the top surface of the film carrier 38 and reaches the reading section 43.

A guide (not shown) which guides the photographic film 22 is provided at the film carrier 38 so as to bend the photographic film 22 at the position at which the slit light is illuminated from the diffusion box 40 (i.e., at the reading position). In this way, the planarity of the photographic film 22 at the reading position can be ensured.

The diffusion box 40 is supported such that the top surface thereof is near the reading position. Thus, a cutout portion is provided in the bottom surface of the film carrier 38 so that the film carrier 38 and the diffusion box 40 do not interfere with each other when the film carrier 38 is loaded.

The film carrier 38 is formed so as to be able to convey the photographic film 22 at various different speeds in accordance with whether prescanning or fine scanning is being carried out, and in accordance with the density of the film image being fine scanned.

The reading section 43 is accommodated within a casing 44. A mounting stand 47, on whose top surface a line CCD 116 is mounted, is provided within the casing 44. Plural supporting rails 49 hang downward from the mounting stand 47. A lens unit 50 is supported by the supporting rails 49 so as to be slidable in the directions of arrow A so as to approach and move away from the work table 27 in order to change the magnification (e.g., reduction, enlargement). A support frame 45 is provided at the work table 27. The mounting stand 47 is supported by guide rails 42 which are mounted to the support frame 45, such that the mounting stand 47 is slidable in directions of arrow B so as to approach and move away from the work table 27 in order to ensure the conjugate length when the magnification is changed or during autofocusing. The lens unit 50 is formed from plural lenses, and a lens diaphragm 51 is provided between the plural lenses. As shown in FIG. 4C, the lens diaphragm 51 is provided with plural diaphragm plates 51A which are each formed in a substantially C-shaped configuration. The diaphragm plates 51A are disposed uniformly around the optical axis L. At each diaphragm plate 51A, one end portion thereof is supported by a pin such that the diaphragm plate 51A can rotate around the pin. The plurality of diaphragm plates 51A are connected to each other via an unillustrated link, and rotate in the same direction when driving force is transmitted thereto from a lens diaphragm driving motor (which will be described later). As the diaphragm plates 51A rotate, the surface area of the portion which is not cut off from light by the diaphragm plates 51A (the substantially star-shaped portion in FIG. 4C) is changed around the optical axis L such that the amount of light which passes through the lens diaphragm 51 changes.

The line CCD 116 is provided with three parallel and spaced-apart lines of sensing portions. Each sensing portion is provided with an electronic shutter mechanism. In each sensing portion, plural photoelectric conversion elements, such as CCD cells or photodiodes, are provided in a line along the transverse direction of the photographic film 22. A color separating filter of R, G or B is mounted to the light-incident side of each sensing portion. (Namely, the line CCD 116 is a so-called 3-line color CCD.) Further, transmitting portions formed from plural CCD cells are provided in vicinities of each of the sensing portions so as to correspond to the sensing portions. The charge accumulated in each CCD cell of the sensing portions is transmitted in order via the corresponding transmitting portion.

A CCD shutter 52 is provided at the light-incident side of the line CCD 116. As illustrated in FIG. 4D, an ND filter 52ND is fit into the CCD shutter 52. The CCD shutter 52 rotates in the direction of arrow u to switch to one of a completely closed state (where a portion such as 52B where there is no ND filter 52ND is positioned at a position 52C which includes the optical axis L) for shading light irradiated onto the line CCD 116 for darkness correction, a completely open state (the position shown in FIG. 4D) for allowing light to be irradiated onto the line CCD 116 for ordinary reading or lightness correction, and a light-reducing state (where the ND filer 52ND is positioned at the position 52C) at which the ND filter 52ND reduces the light irradiated onto the line CCD 116 for linearity correction.

As shown in FIG. 3, a compressor 94 for generating cooling air for cooling the photographic film 22 is disposed at the work table 27. The cooling air generated by the compressor 94 is guided and supplied to a reading section (not shown) of the film carrier 38 by a guide tube 95. Consequently, the region of the photographic film 22 positioned at the reading section can be cooled. The guide tube 95 passes through a flow rate sensor 96 which detects the flow rate of the cooling air. The present embodiment is not limited to use of a flow rate sensor, and a sensor for detecting the speed of the cooling air or a pressure sensor for detecting the pressure of the cooling air may be used instead.

Figure 5:
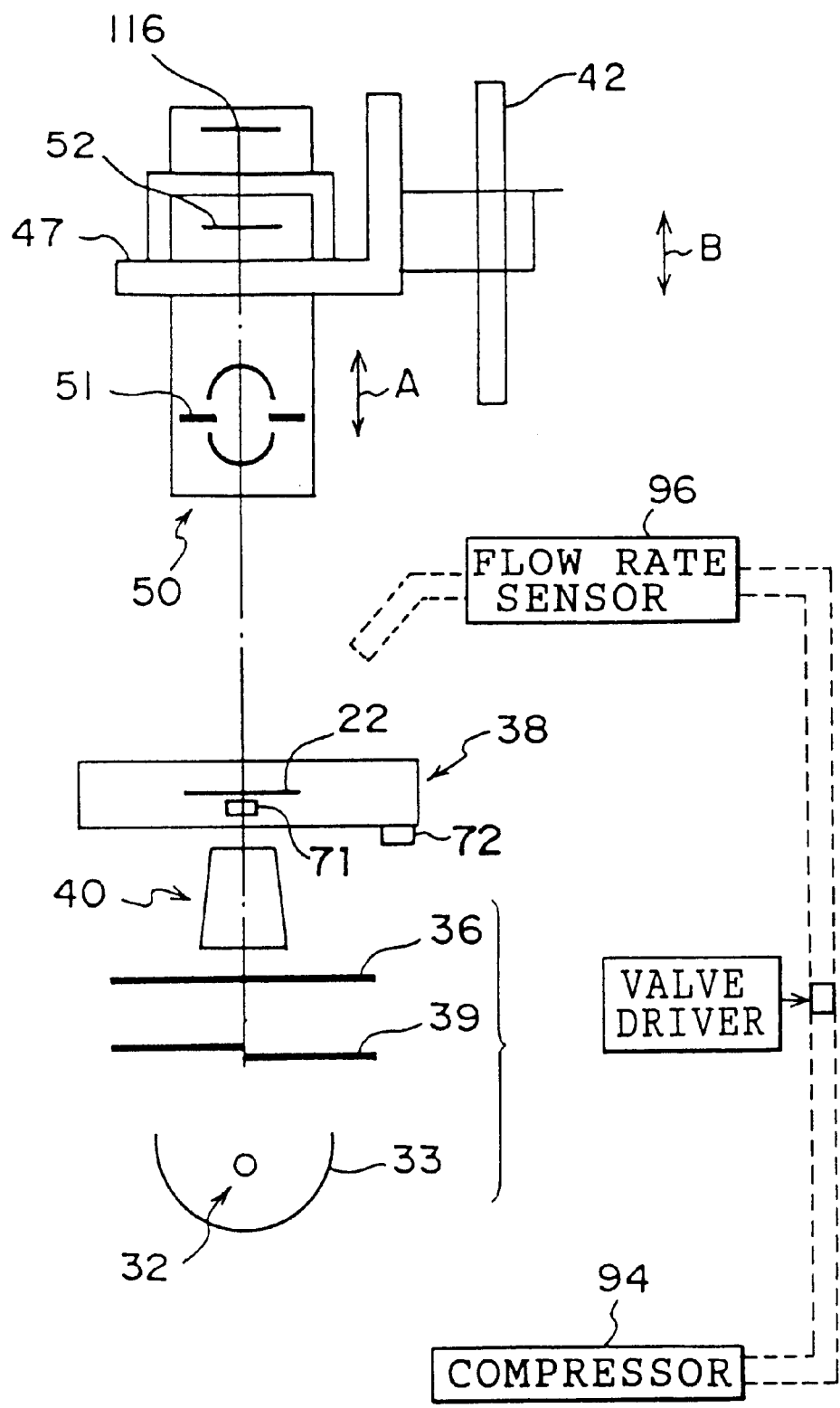
FIG. 5 is a view illustrating only main portions of the optical system of the line CCD scanner.
Figure 6:
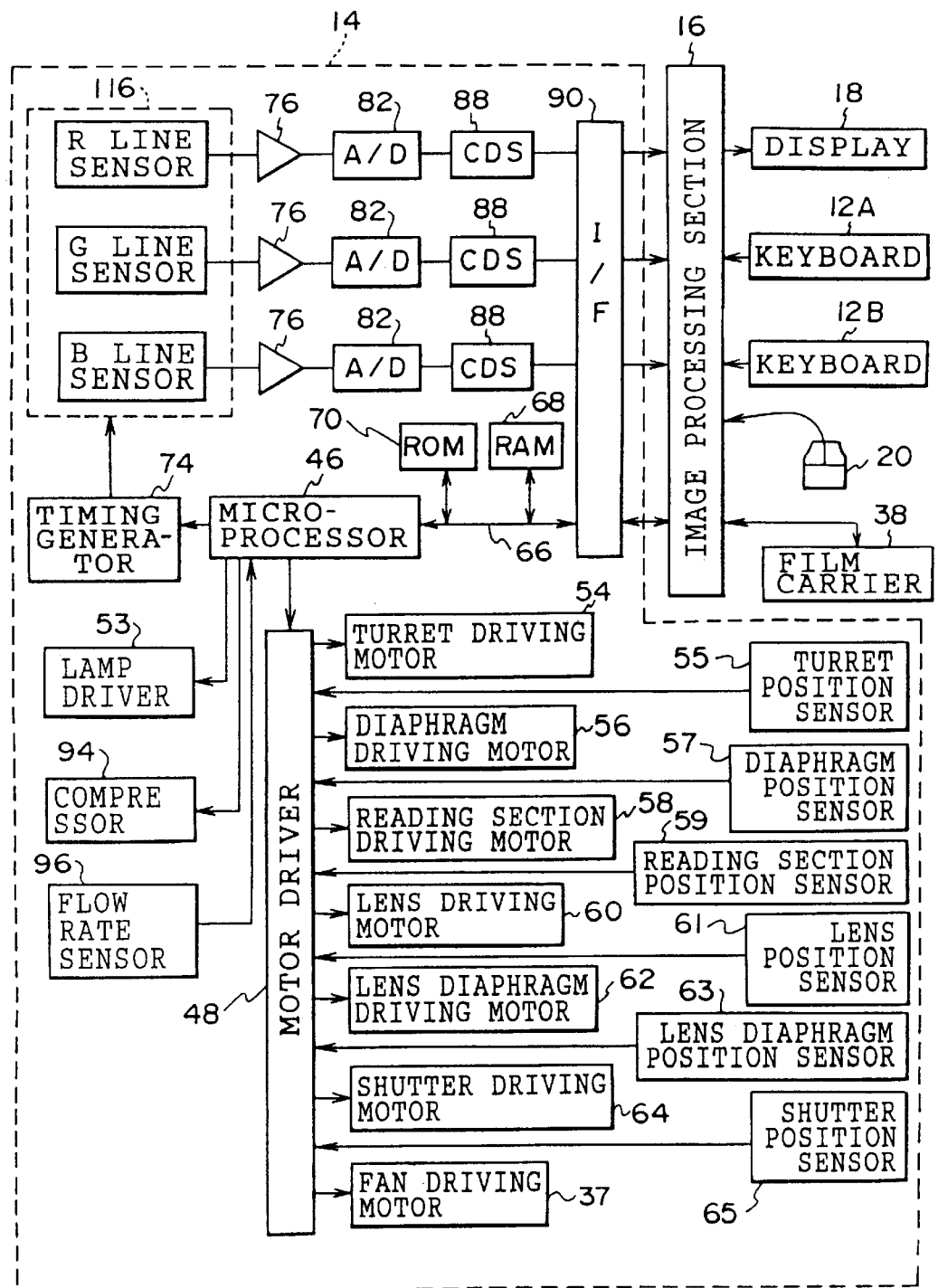
FIG. 6 is a block diagram illustrating a schematic structure of an electrical system of the line CCD scanner.

The schematic structure of the electrical system of the line CCD scanner 14 and the image processing section 16 will be described hereinafter on the basis of FIG. 6, with reference to FIG. 5 which illustrates the main portions of the optical system of the line CCD scanner 14.

The line CCD scanner 14 has a microprocessor 46 which governs the overall control of the line CCD scanner 14. A RAM 68 (e.g., an SRAM) and a ROM 70 (e.g., a ROM whose stored contents are rewritable) are connected to the microprocessor 46 via a bus 66. A lamp driver 53, the compressor 94, the flow rate sensor 96, and a motor driver 48 are connected to the microprocessor 46. The lamp driver 53 turns the lamp 32 on and off in accordance with instructions from the microprocessor 46. When the film image of the photographic film 22 is being read, the microprocessor 46 operates the compressor 94 to supply cooling air to the photographic film 22. The flow rate of the cooling air is detected by the flow rate sensor 96, and the microprocessor 46 senses abnormalities.

A turret driving motor 54 and a turret position sensor 55 are connected to the motor driver 48. The turret driving motor 54 drives the turret 36 to rotate in the direction of arrow t in FIG. 4B such that one of the balance filter 36N for negative films or the balance filter 36P for reversal films of the turret 36 is positioned on the optical axis L. The turret position sensor 55 detects a reference position of the turret 36 (an unillustrated cutout portion). Also connected to the motor driver 48 are a diaphragm driving motor 56 for sliding the diaphragm 39, a diaphragm position sensor 57 which detects the position of the diaphragm 39, a reading section driving motor 58 which slides the mounting stand 47 (i.e., the line CCD 116 and the lens unit 50) along the guide rails 42, a reading section position sensor 59 for detecting the position of the mounting stand 47, a lens driving motor 60 which slides the lens unit 50 along the supporting rails 49, a lens position sensor 61 for detecting the position of the lens unit 50, a lens diaphragm driving motor 62 for rotating the diaphragm plates 51A of the lens diaphragm 51, a lens diaphragm position sensor 63 for detecting the position of the lens diaphragm 51 (the position of the diaphragm plates 51A), a shutter driving motor 64 for switching the CCD shutter 52 between the completely closed state, the completely open state, and the light-reducing state, a shutter position sensor 65 for detecting the position of the shutter, and a fan driving motor 37 for driving the fans 34.

When prescanning (preliminary reading) and fine scanning (main reading) are carried out by the line CCD 116, on the basis of the positions of the turret 36 and the diaphragm 39 detected by the turret position sensor 55 and the diaphragm position sensor 57, the microprocessor 46 rotates the turret 36 by the turret driving motor 54 and slides the diaphragm 39 by the diaphragm driving motor 56 so as to adjust the light illuminated onto the film image.

The microprocessor 46 determines the zoom magnification in accordance with the size of the film image, whether trimming is to be carried out, and the like. The microprocessor 46 slides the mounting stand 47 by the reading section driving motor 58 on the basis of the position of the mounting stand 47 detected by the reading section position sensor 59, so that the film image is read by the line CCD 116 at the determined zoom magnification. Further, the microprocessor 46 slides the lens unit 50 by the lens driving motor 60 on the basis of the position of the lens unit 50 detected by the lens position sensor 61.

When focussing control to make the light-receiving surface of the line CCD 116 coincide with the film image image-forming position by the lens unit 50 is carried out (i.e., when autofocusing control is carried out), the microprocessor 46 slides only the mounting stand 47 by the reading section driving motor 58. This focussing control can be carried out such that, for example, the contrast of the film image read by the line CCD 116 is a maximum (what is known as the image contrast method). Alternatively, a distance sensor which measures by infrared rays or the like the distance between the photographic film 22 and the lens unit 50 (or the line CCD 116) may be provided, and focussing control can be carried out on the basis of the distance detected by the distance sensor instead of on the basis of the data of the film image.

A timing generator 74 is connected to the line CCD 116. The timing generator 74 generates various types of timing signals (clock signals) for operating the line CCD 116, A/D converters 82 which will be described later, and the like. The signal output terminals of the line CCD 116 are connected to the A/D converters 82 by amplifiers 76. The signals outputted from the line CCD 116 are amplified by the amplifiers 76 and are converted into digital data at the A/D converters 82.

The output terminals of the A/D converters 82 are connected to the image processing section 16 via correlation double sampling circuits (CDS) 88 and an interface (I/F) circuit 90 in that order. At the CDS 88, feedthrough data which expresses the level of a feedthrough signal and pixel data expressing the level of a pixel signal are respectively sampled, and the feedthrough data is subtracted from the pixel data for each pixel. The CDS 88 successively outputs the results of calculation (pixel data which accurately corresponds to the amount of accumulated charge in each CCD cell) to the image processing section 16 via the I/F circuit 90 as scan image data.

Because the R, G, B reading signals are outputted in parallel from the line CCD 116, three signal processing systems, each having an amplifier 76, an A/D converter 82 and a CDS 88, are provided. The R, G, B image data which is the scan image data are inputted in parallel from the I/F circuit 90 to the image processing section 16.

The display 18, the keyboards 12A, 12B, the mouse 20 and the film carrier 38 are connected to the image processing section 16.

Next, operation of the present embodiment will be explained.

Figure 7:
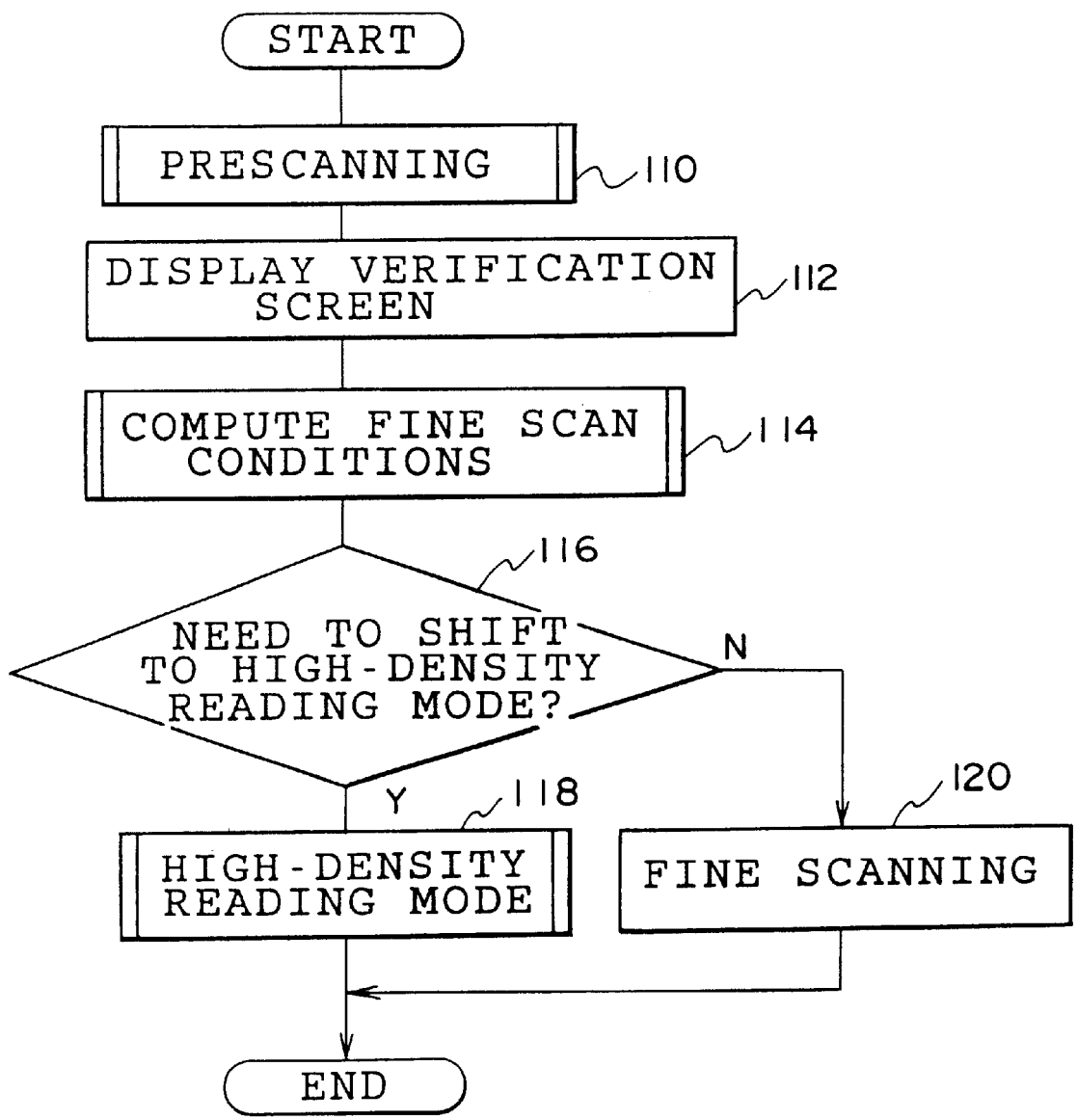
FIG. 7 is a flowchart illustrating a main control routine.

FIG. 7 illustrates a main control routine of the line CCD scanner 14 relating to the present embodiment.

The initial screen of the display 18 displays plural print sizes and plural types of prints (bordered/borderless). By using the mouse or keys, the operator selects a desired print size and a desired type of print from the displayed plural print sizes and print types. When the film carrier 38 is loaded and the photographic film 22 is inserted into the loaded film carrier 38, a photographic film identifying sensor (not shown) of the film carrier 38 senses the photographic film 22, and the film carrier 38 automatically begins to convey the photographic film 22.

Simultaneously, the main control routine of the line CCD scanner 14 begins. In step 110, in a preparatory state for carrying out preliminary reading (hereinafter, "prescanning") for determining optimal exposure conditions, the respective sections are moved, and the photographic film 22 is prescanned while being conveyed at a predetermined constant speed such that the image recorded on the photographic film 22 is read roughly.

The selection of the print size and print type may be carried out when a verification screen which will be described later is displayed.

Figure 8:
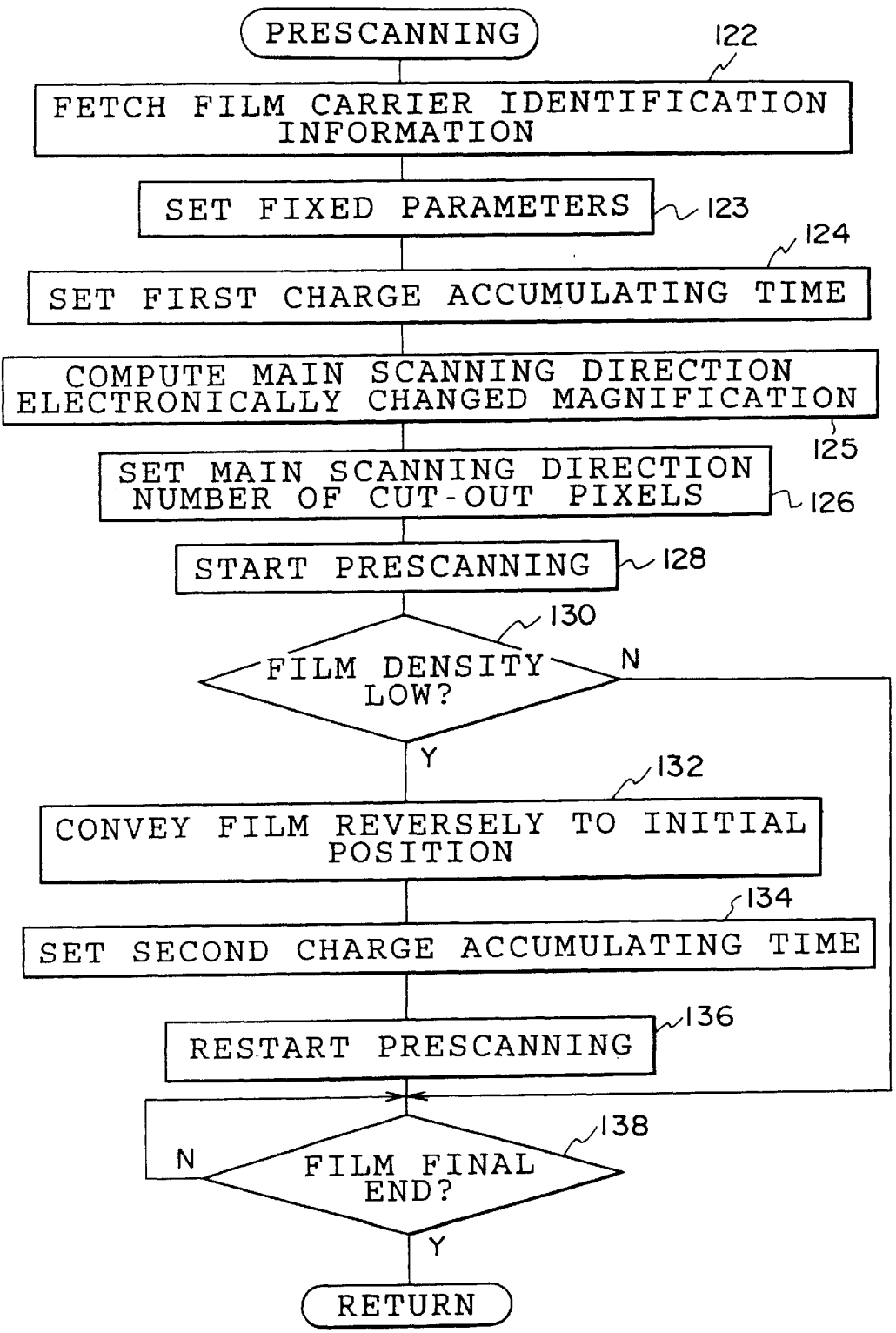
FIG. 8 is a flowchart illustrating a prescanning processing routine.

Hereinafter, the details of prescanning processing will be explained with reference to the prescanning processing (set up calculation) routine illustrated in FIG. 8.

In step 122, film carrier identification information is read. Namely, when the film carrier 38 is loaded at the line CCD scanner 14, a film carrier identification signal is inputted to the line CCD scanner 14 from the film carrier 38. In this way, the line CCD scanner 14 stores the information identifying the film carrier 38 (film carrier identification information). In this step, the stored film carrier identification information is fetched.

There are various types of film carriers 38 such as 135 AFC which is a film carrier for conveying 135 size photographic films, 240 AFC which is a film carrier for conveying photographic films on which a transparent magnetic layer is formed (240 size photographic films, or what are known as "APS films"), and the like. The film carrier identification information is information for identifying the type of the film carrier 38.

When the type of the film carrier 38 has been identified, the size of the photographic film being conveyed by the film carrier is determined.

In step 123, in accordance with the film carrier identification information (namely, the film carrier type), fixed parameters such as the conveying speed, the optical magnification, the lens F value (lens F number), the light source diaphragm, the reading period, and the like, are obtained from Table 1, and are set.

TABLE 1

|  | 135AFC | 240AFC |
| --- | --- | --- |
| conveying speed (mm/msec) | 0.190 | 0.1585 |
| optical magnification | 0.6 | 0.8 |
| lens F value | 2.0 | 2.0 |
| light source diaphragm | 0.0 (completely open) | 0.0 (completely open) |
| reading period (msec/line) | 0.422 | 0.422 |

In step 124, a first charge accumulating time is set. Namely, the charge accumulating time for each of the colors R, G, B is made to be the above set reading period. Note that the B gain is 1×.

Figure 12:
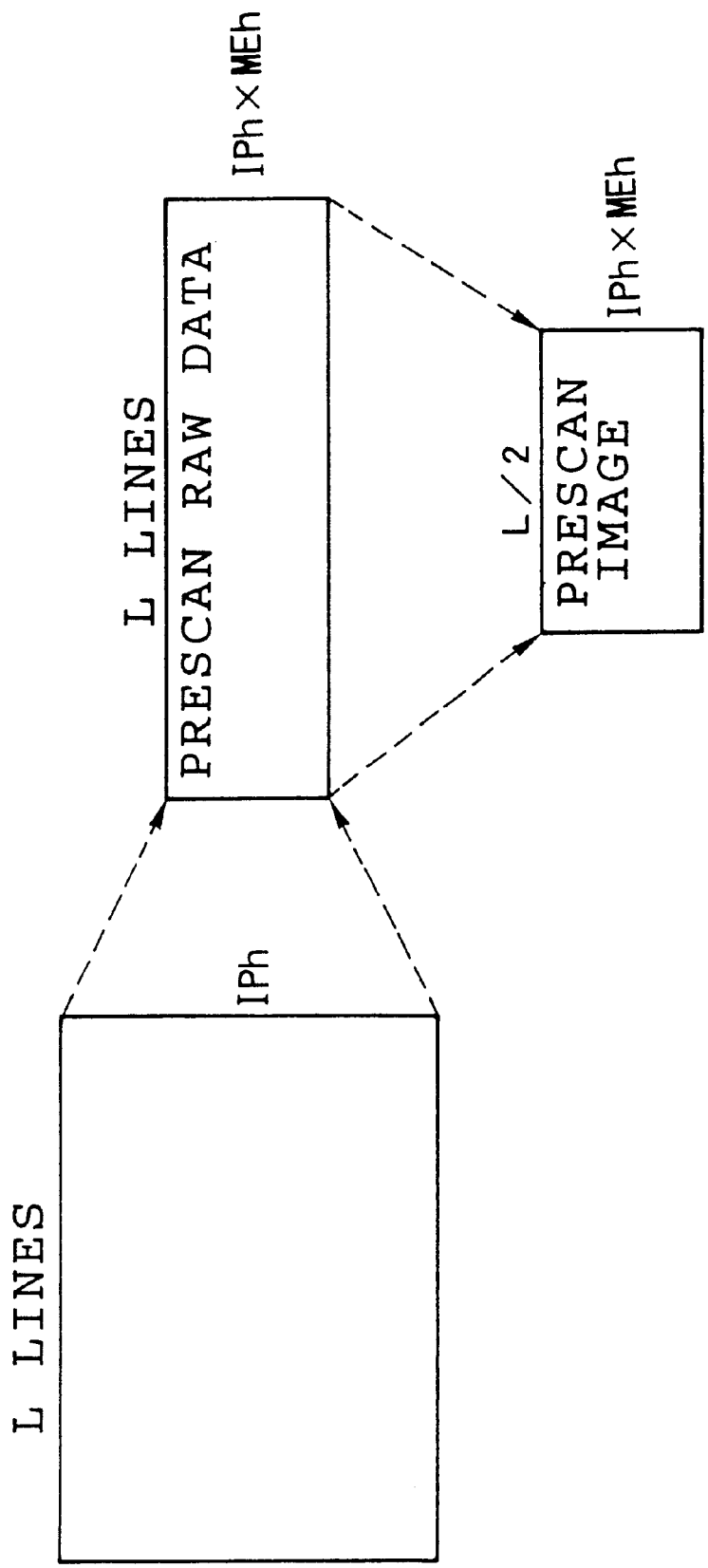
FIG. 12 is a schematic view illustrating a prescan image and prescan raw data.

In step 125, an electronically changed magnification MEh for the main scanning direction is computed. As illustrated in FIG. 12, the number L of lines of prescan data is:

$$L = \text{film length/film length required for one reading} = \text{film length/(conveying speed} \times \text{reading period)}$$

The prescan image is obtained by selecting either the odd lines or the even lines from the lines of the prescan data. Therefore, the number of lines of the prescan image is L/2. In the main scanning direction, the aspect ratio of the pixels at the prescan image is 1:1. Namely, the number of pixels corresponding to λmm on the film at the prescan image is:

$$(\lambda/(\text{conveying speed} \times \text{reading period})) \times (\tfrac{1}{2})$$

The number of pixels corresponding to the film width before the electronic magnification change is:

$$(\text{film width}) \times (\text{optical magnification}) \div (\text{pixel pitch}).$$

The number of pixels corresponding to the film width after the electronic magnification change is:

$$(\text{film width}) \div (\text{conveying speed}) \div (\text{reading period}) \div 2.$$

Thus, the electronically changed magnification MEh is:

$$MEh = (\text{pixel pitch}) \div (\text{optical magnification}) \div (\text{conveying speed}) \div (\text{reading period}) \div 2.$$

In the case of 135 AFC:

$$MEh = (0.008) \div (0.6) \div (0.1900) \div (0.422) \div 2 = 0.083.$$

In the case of 240 AFC:

$$MEh = (0.008) \div (0.8) \div (0.1585) \div (0.422) \div 2 = 0.075.$$

In step 126, the number of cut-out pixels in the main scanning direction is set. Here, the main scanning direction number of cut-out pixels IPh must be the number of pixels in a region, within the prescan data, in which the edges of the photographic film are definitely included, and is determined by the following formula:

$$IPh=(\text{film width}+a)\times(\text{optical magnification})\div(\text{pixel pitch}).$$

Here, a must be greater than or equal to the sums listed in Table 2.

TABLE 2

| Factor | 135AFC | 240AFC |
| --- | --- | --- |
| Margin in dimension of carrier opening | 0.15 mm | 0.15 mm |
| Manufacturing variance in carrier (±0.2 mm) | 0.40 mm | 0.40 mm |
| Attachment/removal variance in carrier (±0.2 mm) | 0.40 mm | 0.40 mm |
| Variance in optical axis (= ±30 pixels × 0.008 ÷ optical magnification) | 0.80 mm | 0.60 mm |
| Electronically changed magnification resolution (= ±1 pixel × 0.008 ÷ optical magnification) | 0.17 mm | 0.14 mm |
| Total | 1.92 mm | 1.69 mm |

Here, if a=2.0 mm for both 135 AFC and 240 AFC, in the case of 135 AFC:

$$MEh=(35+2)\times(0.6)\div(0.008)=2775,$$

and in the case of 240 AFC:

$$MEh=(24+2)\times(0.6)+(0.008)=1950.$$

In step 128, the respective sections are controlled on the basis of the conditions set as described above, and prescanning begins. Namely, the film carrier conveys the photographic film at the above conveying speed. The reading section driving motor 58 is controlled so that the optical magnification becomes the above optical magnification. The lens driving motor 60 is controlled so that the lens F value becomes the above lens F value. The diaphragm driving motor 56 is controlled so that the light source diaphragm becomes the above light source diaphragm. The CCD line sensor 116 carries out reading for the above charge accumulating time.

In step 130, by determining whether the density of the photographic film is less than a predetermined value, it is determined whether the density of the photographic film is low. If the density of the photographic film is not low, the routine proceeds to step 138. If the density of the photographic film is low, in step 132, the photographic film is conveyed in the reverse direction to its initial position. In step 134, a second charge accumulating time is set, and in step 136, prescanning is begun again.

Here, the second charge accumulating time is determined as follows. Namely, the device light amounts (densities) under the prescan conditions obtained by lightness correction are Dpr, Dpg, Dpb. Further, the light amount margins (densities) Dar, Dag, Dab are obtained from Table 3.

TABLE 3

|  | Dar | Dag | Dab |
| --- | --- | --- | --- |
| 135 AFC | 1.2 | 1.2 | 0.9 |
| 240 AFC | 1.1 | 1.1 | 0.8 |

Implementation values Dvr, Dvg, Dvb of the respective colors at the completely open position of the light source diaphragm are obtained from a diaphragm table determined in advance from a maintenance function.

On the basis of the device light amounts (densities), light amount margins (densities) and implementation values at the completely open position of the light source diaphragm, the second charge accumulating times ET1 (msec) are computed from the following formulae.

$$ET1r=0.422\times(-\log(Dpr-Dar+Dvr))$$

$$ET1g=0.422\times(-\log(Dpg-Dag+Dvg))$$

$$ET1b=0.422\times(-\log(Dpb-Dab+Dvb))$$

The B gain is 1×.

In step 138, a determination is made as to whether the trailing end of the photographic film has been detected. If the trailing end of the photographic film has been detected, the routine ends and prescanning is completed.

Figure 13:
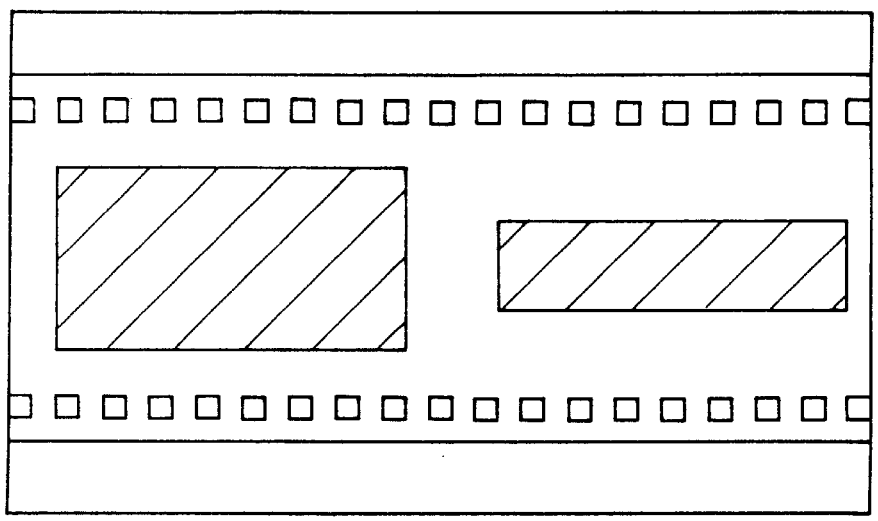
FIG. 13 is a schematic view illustrating prescan data.

When prescanning is completed, in step 112, a verification screen G (e.g., a positive image) showing the finished state is displayed on the display 18 as shown in FIG. 13. The necessary portions are cut out from the prescan data and displayed on the verification screen G. The region to be shown in the print is displayed in a state of being superposed on the necessary portions which are displayed.

Here, the image which is cut-out from the prescan data is, for example, a region which is on the photographic film and which corresponds to one of the sizes shown in Table 4. This region can be changed from the standpoint of operability.

TABLE 4

| Carrier Type | Film Size | Main Scanning Direction | Subscanning Direction |
| --- | --- | --- | --- |
| 135 AFC | 135F | 24.4 mm | 36.4 mm |
|  | 135P | 12.9 mm | 36.4 mm |
|  | 135H | 24.4 mm | 17.6 mm |
|  | 135HV | 19.8 mm | 36.4 mm |
| 240 AFC | 240 | 16.7 mm | 30.2 mm |
| MFC | 110 | 12.9 mm | 17.0 mm |
|  | 126 | 28.0 mm | 28.5 mm |
|  | 6 × 4.5 | 56.0 mm | 41.5 mm |
|  | 6 × 6 | 56.0 mm | 56.0 mm |
|  | 6 × 7 | 56.0 mm | 69.0 mm |
|  | 6 × 8 | 56.0 mm | 75.0 mm |
|  | 6 × 9 | 56.0 mm | 82.6 mm |

In the prescan data, the number of pixels corresponding to λ mm on the film is λ/(conveying speed×reading period×2).

The size of the region on the photographic film, which region is to be shown on the print, is calculated by using the print magnification.

For the Case of a Borderless Print.

region to be shown on print (mm)=(print size/print magnification)

For the Case of a Bordered Print:

region to be shown on print (mm)=((print size−border)/(print magnification)

The number of pixels, at the prescan image, corresponding to χ(mm) on the print is (χ/print magnification)×(conveying speed×reading period×2).

The region to be shown on the print is displayed by using the above formulas.

Hereinafter, print magnification will be explained. The print magnification is the ratio of the size of the read portion of the image recorded on the photographic film to the size, on the print surface at the time of printing, of the read image.

Namely, the print magnification is the ratio of the size of the image on the print surface to the length of the standard scannable range.

Figure 14:
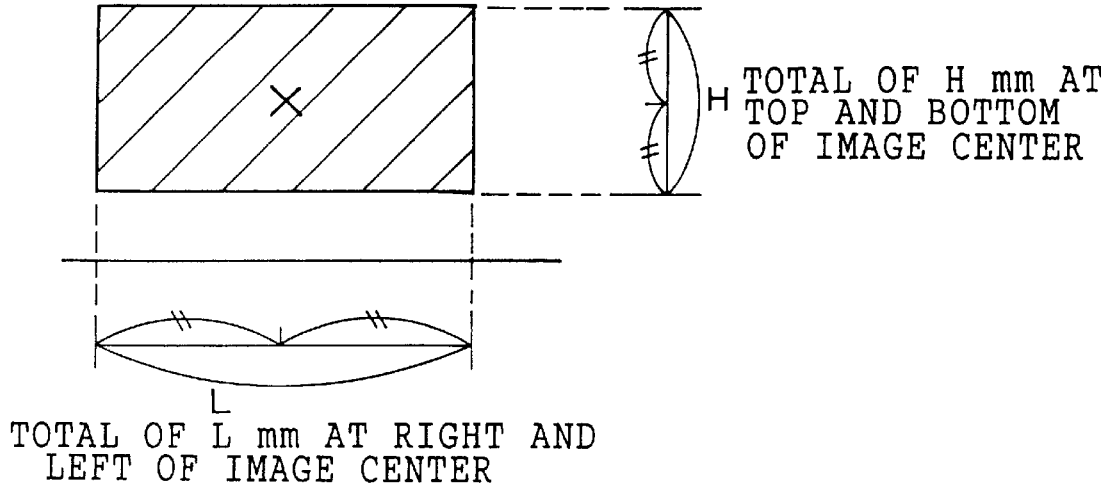
FIG. 14 is a view for explaining a standard scannable range.

The standard scannable range on the image surface of the photographic film (i.e., the read portion of the image of the photographic film) is prescribed in accordance with the aforementioned film carrier identification information, as shown in FIG. 14.

For the standard scannable range on the image surface of the photographic film, with regard to the main scanning direction, Hmm is set as shown in Table 5 with the main scanning direction center of the image surface as a reference, and with regard to the subscanning direction, L mm is set as shown in Table 5 with the subscanning direction center of the image surface as a reference.

The center of the image surface in the main scanning direction is a position determined from the edges of the photographic film. In contrast, the center of the image surface in the subscanning direction is a position determined by image surface detection (and is a position which is finely adjusted by an operator).

TABLE 5

| Carrier Type | Film Size | H | L |
|---|---|---|---|
| 135AFC | 135F | 23.6 | 34.8 |
|  | 135P | 12.9 | 34.8 |
|  | 135HV | 19.8 | 34.8 |
|  | 135H | 23.6 | 17.2 |
| 240AFC | 240 (C, H, P) | 16.3 | 29.8 |

Figure 15:
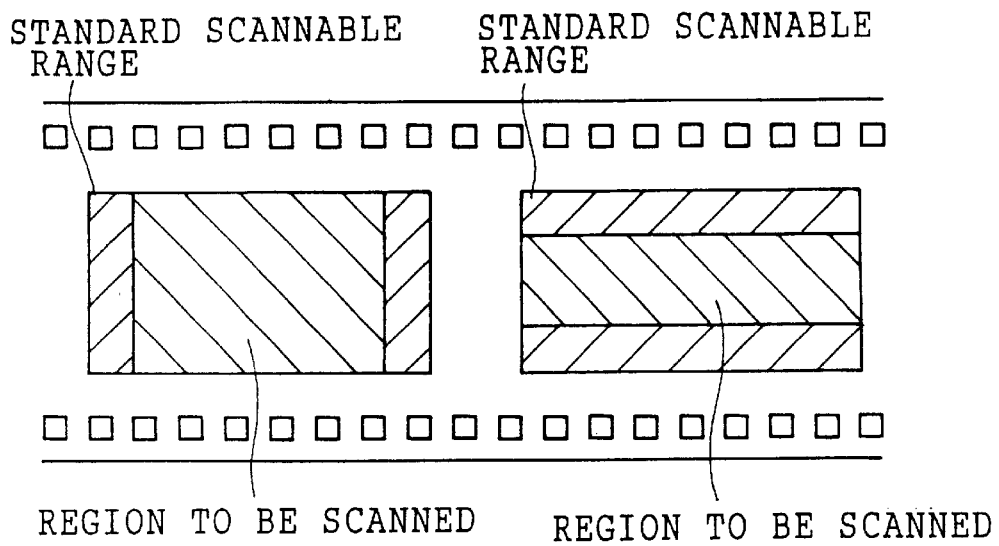
FIG. 15 is a view illustrating the relationship between the standard scannable range and a region to be scanned.

As shown in FIG. 15, the standard print magnification uses a region which is scanned on the photographic film so as to become a maximum within a range which does not project out from the standard scannable range (i.e., a region of a size of a read portion of the image of the photographic film).

Figure 16:
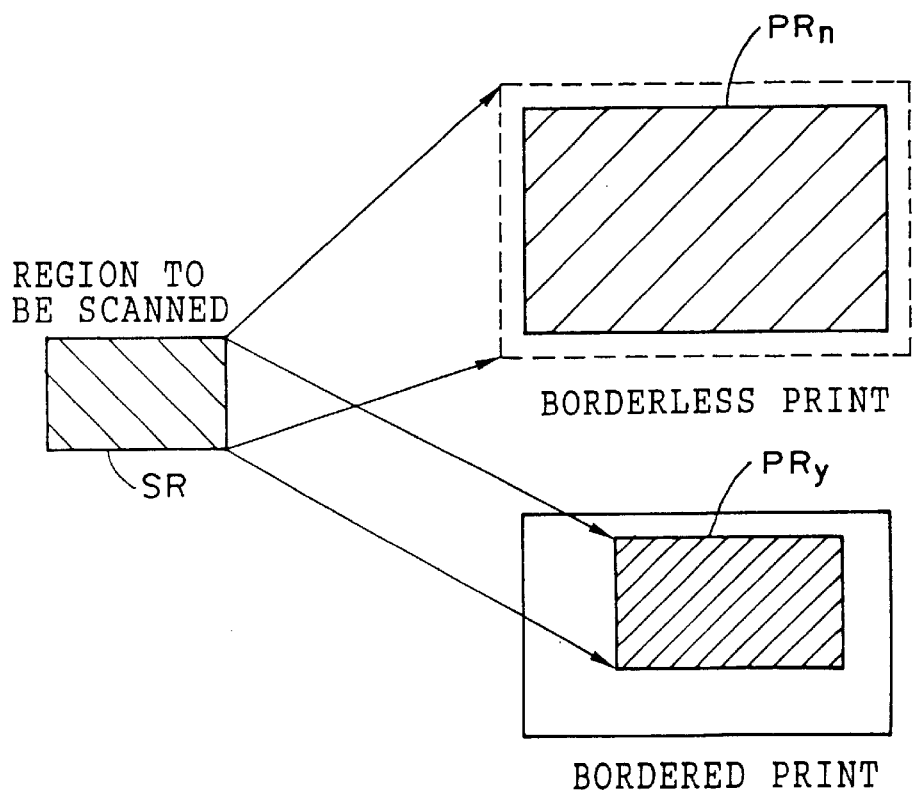
FIG. 16 is a view illustrating a borderless print and a bordered print.
Figure 17:
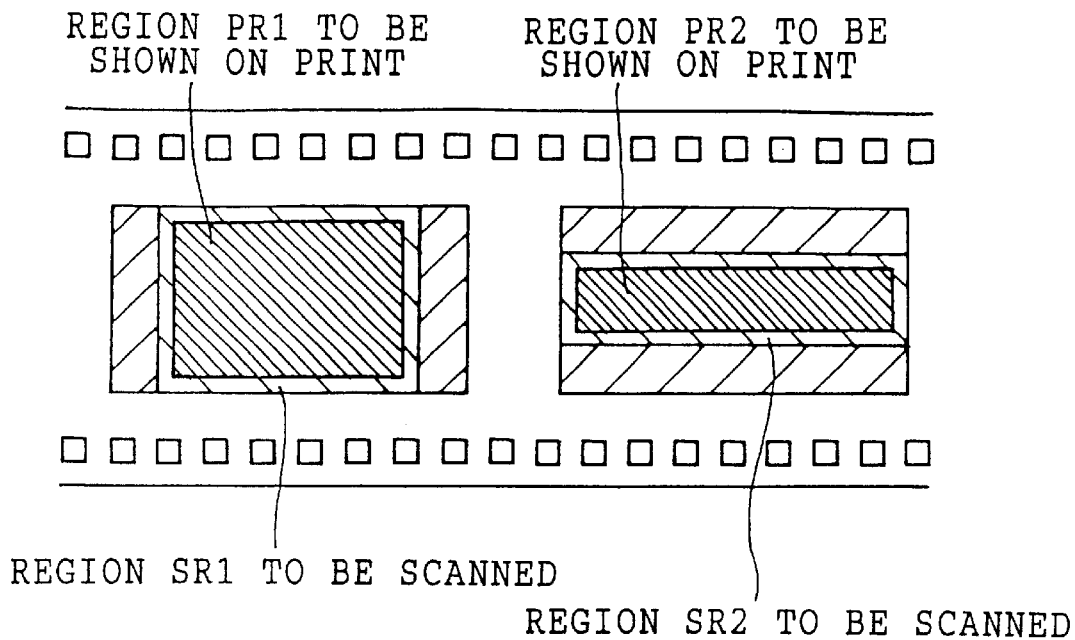
FIG. 17 is a view illustrating a region to be shown in a borderless print.

In the case of a borderless print, the scanned region is mapped so as to project out slightly from the outer sides of the print surface (to form what are known as omitted portions). As a result, the region $PR_n$ which is to be shown in the print is a range which is slightly more narrow than the scanned range SR, as shown in FIG. 16. The portions within the scanned region SR which are not the region $PR_n$ to be shown in the print correspond to so-called omitted portions. Further, as shown in FIG. 17, a region PR1, to be shown in the print, of an image of an ordinary photographic film is slightly narrower than the scanned region SR1 as shown in FIG. 16. Similarly, a region PR2, to be shown in the print, of a panorama-size image of a photographic film is a range which is slightly narrower than the scanned region SR2 as shown in FIG. 16.

In the case of a bordered print, the scanned region is mapped as it is onto a region within the border of the print. For this reason, as illustrated in FIG. 16, the region $PR_y$ to be shown in the print is equivalent to the scanned region SR.

The standard print magnification is calculated as follows. Whether the print is to be bordered or borderless, and the film size are determined by selection by the operator as explained previously.

For a Borderless Print.

The greater value of the following two values A and B is used as the standard print magnification for a borderless print.

A. (length of long side of print size+omitted portion)/length of long side of standard scannable range B. (length of short side of print size+omitted portion)/length of short side of standard scannable range For a Bordered Print.

The greater value of the following two values C and D is used as the standard print magnification for a bordered print.

C. length of long side of print surface portion without the border/length of long side of standard scannable range D. length of short side of print surface portion without the border/length of short side of standard scannable range It is presupposed that the omitted portion is generated by processing at the printer section. The print magnification is realized from the optical magnification and the electronically changed magnification by the following formula.

print magnification=optical magnification×electronically changed magnification×γ wherein γ=(output pixel size)/(input pixel size). For example,

γ=(25.4)/(300)×(1/0.008)=10.583.

The optical magnification is selected from the following values: 0.6, 0.8, 1.0, 1.2, 1.3. The electronically changed magnification is in the range of 3.1% to 400.0%, and can be set in increments of 0.1%. Thus, the set unit of the print magnification is, at maximum, 1.3×0.001×10.583=0.0138, and, at minimum, 0.6×0.001×10.583=0.0063.

Including the standard print magnification and the magnification set by the user at the time of trimming, the unit of the print magnification is 0.01.

The standard print magnification is computed at the time of newly registering a print size. If the combination of the type of the photographic film and the print size is a combination which is already known, a standard print magnification which has been computed and stored in advance as described above is used. Note that the value of the standard print magnification can be changed by fine adjustment by a user.

The operator verifies the verification screen G displayed on the display 18. As needed, the operator manually carries out correction with respect to the image density, the color, or the like, and carries out center trimming if required. The operator then designates the image range to be read.

"Center trimming" is a function by which the print magnification can be freely changed. As a result of center trimming, the region to be scanned is changed. However, the region to be scanned can be set in a range at which the image of the photographic film is formed within the region of the CCD sensor. The enlargement/reduction, movement, and rotation in the method for setting the trimming are set as follows. In the case of enlargement/reduction, there are, for example, the following two methods: a method of setting the trimming frame by a mouse or key input, and a method of inputting the print magnification value. In the case of movement, the trimming frame is moved by a mouse or key input. In the case of rotation, the rotational angle is manipulated by mouse or key input.

Figure 18:
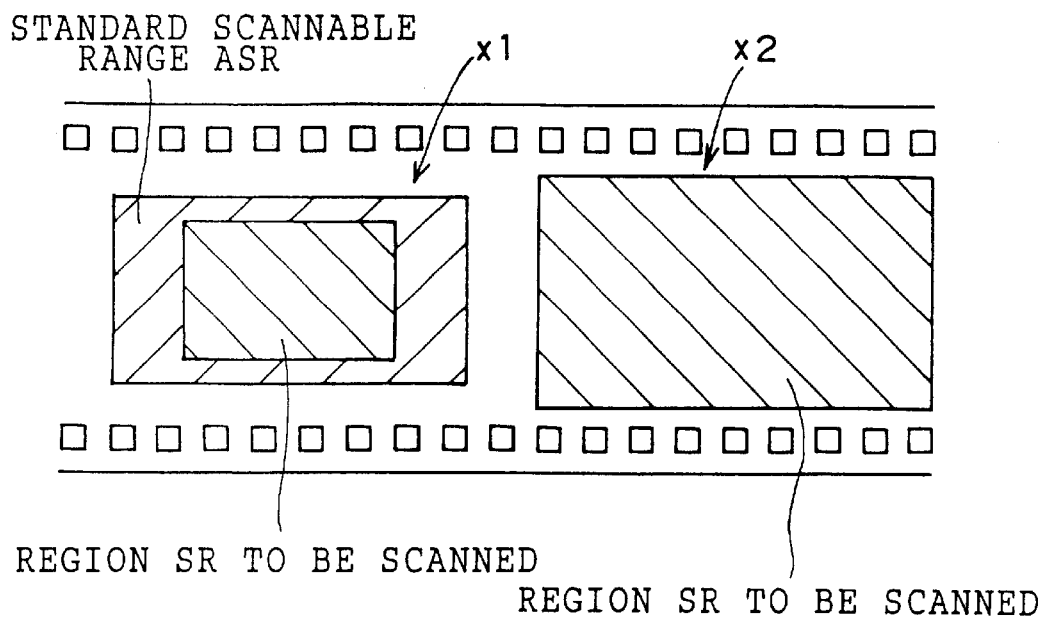

Print magnification fine adjustment is also a function by which the print magnification can be changed freely, and is carried out similarly to trimming processing. In this case, as is represented by the reference numeral x2 in FIG. 18, the scanned region SR can project out from the standard scannable range. Reference numeral x1 in FIG. 18 is an example in which the scanned region SR does not project out from the standard scannable range ASR.

When the necessary information are inputted in this way, the fine scan conditions are computed in step 114.

Figure 9:
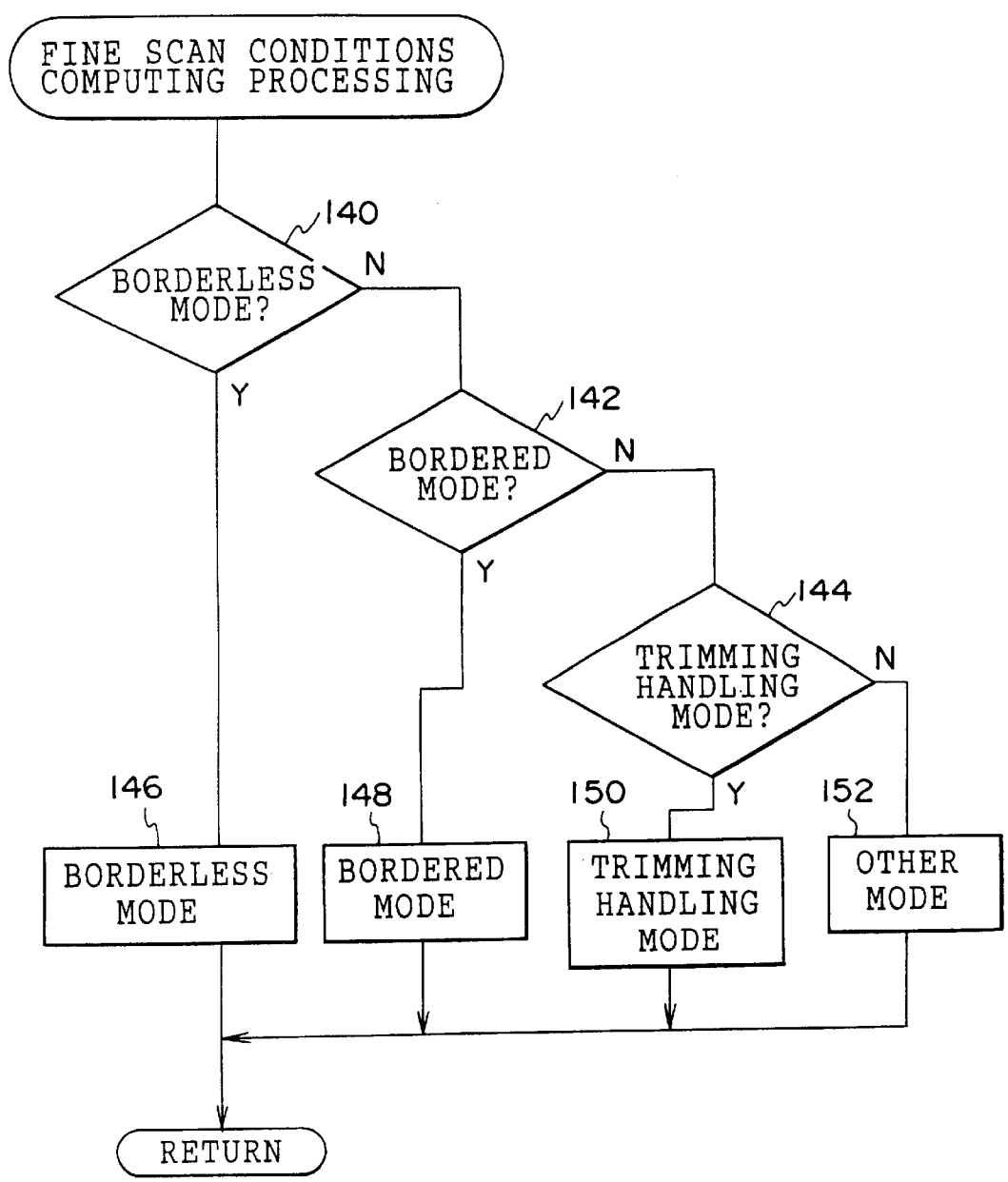
FIG. 9 is a flowchart illustrating a fine scan conditions computing processing routine.

The fine scan conditions computing processing will be described hereinafter with reference to the fine scan conditions processing routine illustrated in FIG. 9.

In step 140, it is determined, from the designated print type (bordered or borderless), whether or not the mode is the borderless mode. If the mode is the borderless mode, in step 146, borderless mode processing is carried out. If the mode is not the borderless mode, in step 142, a determination is made as to whether or not the mode is the bordered mode. If the mode is the bordered mode, in step 148, bordered mode processing is carried out. If the mode is not the bordered mode, in step 144 a determination is made as to whether or not the mode is the trimming handling mode. If the mode is the trimming handling mode, in step 150, trimming handling mode processing is carried out, whereas if the mode is not the trimming handling mode, in step 152, another mode is carried out.

Figure 10:
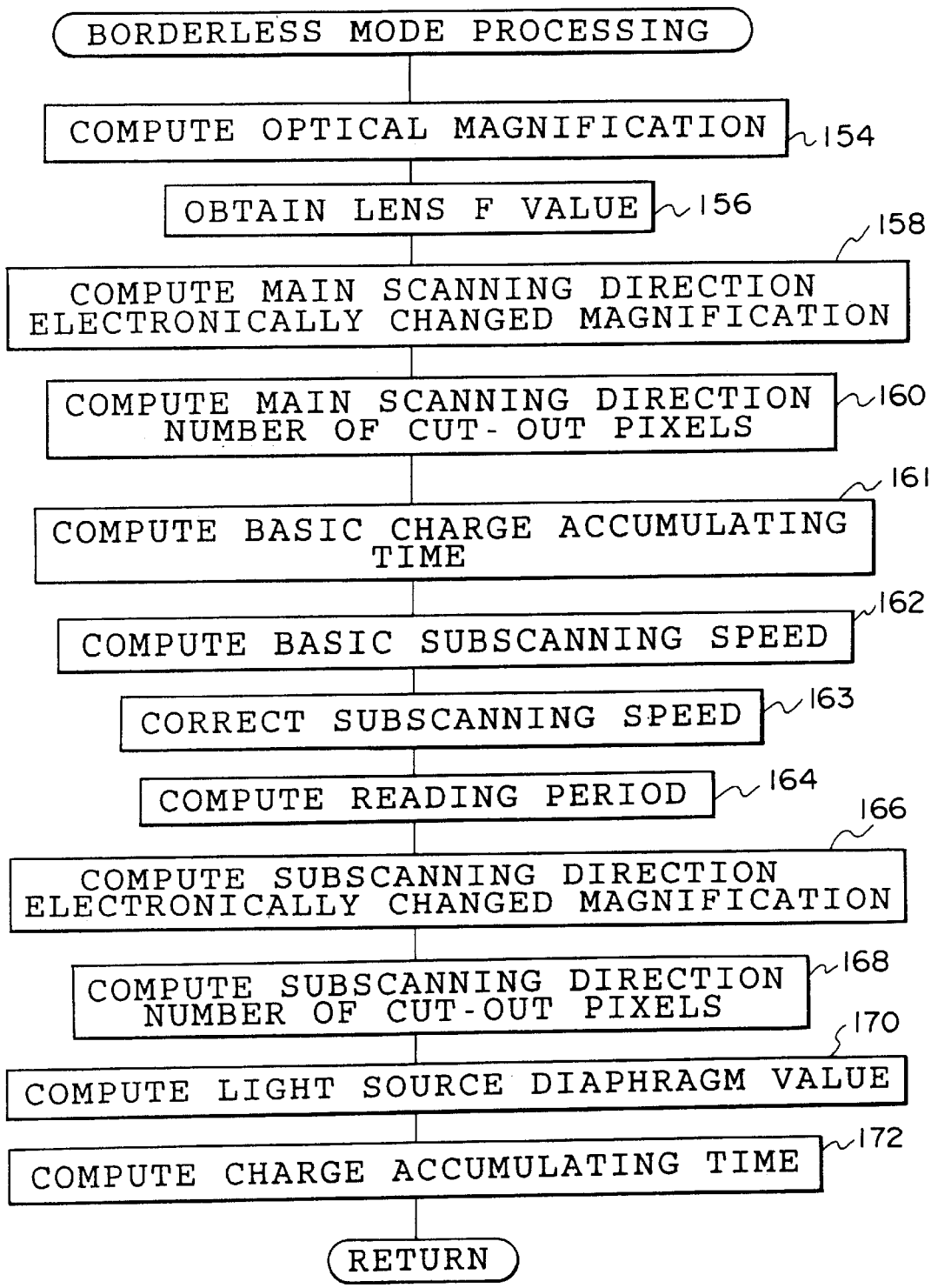
FIG. 10 is a flowchart illustrating a borderless mode processing routine.

Next, the borderless mode processing will be explained with reference to the borderless mode processing routine shown in FIG. 10.

In step 154, the optical magnification MO is computed.

Namely, first, a provisional optical magnification MO1 at an electronically changed magnification of 100% is determined by the following formula:

$$MO1 = MP \div \gamma$$

wherein MP is the print magnification, and $\gamma$ is the size ratio between one pixel at the output side and one pixel at the input side, namely:

$$\gamma = \text{output size } P_o \div \text{input size } P_{ccd} = (25.4 \div 300) \div 0.008 = 10.583.$$

Use of the optical magnification is limited to a certain fixed position.

Further, because the electronically changed magnification is desirably smaller than 100% in consideration of preventing moire and the like, the optical magnification is set to be slightly high.

The optical magnification MO is selected from following Table 6 on the basis of the provisional optical magnification MO1.

TABLE 6

| Carrier Type | Film Size | Conditions for Judgement | Optical Magnification |
|---|---|---|---|
| 135 AFC | 135F (no panorama size frames included) | MO1 ≤ 0.45 | 0.6 |
| | | 0.45 < MO1 ≤ 0.7 | 0.8 |
| | | 0.7 < MO1 | 1.2 |
| | 135P | MO1 ≤ 0.8 | 0.6 |
| | 135F (panorama size frames included) | 0.8 < MO1 ≤ 1.0 | 0.8 |
| | | 1.0 < MO1 | 1.2 |
| | 135HV | MO1 ≤ 0.6 | 0.6 |
| | | 0.6 < MO1 ≤ 0.8 | 0.8 |
| | | 0.8 < MO1 | 1.2 |
| | 135H | MO1 ≤ 0.85 | 0.8 |
| | | 0.85 < MO1 | 1.2 |
| 240 AFC | 240(C) | MO1 ≤ 0.6 | 0.8 |
| | 240(H) | 0.6 < MO1 ≤ 0.9 | 1.0 |
| | | 0.9 < MO1 | 1.3 |
| | 240(P) | MO1 < 0.94 | 0.8 |
| | | 0.94 < MO1 ≤ 1.1 | 1.0 |
| | | 1.1 < MO1 | 1.3 |

In Table 6, "panorama size frames included" means that both panorama size frames and frames of other sizes are included in a single roll of photographic film. The determination as to whether a frame image is a panorama-size frame image cannot be made until a print instruction is given by a verification operation carried out by the operator. Therefore, it cannot be verified whether or not panorama-size frame images are also included until the start of the fine scan of the first frame of the photographic film. Therefore, there are cases in which a photographic film is first processed in a way in which it is considered that no panorama-size images are included therein, and then, in the midst of processing, the photographic film is processed in a way in which it is considered that panorama-size images are included among the frame images thereof.

In step 156, a diaphragm value (lens F value) corresponding to the optical magnification MO is obtained from Table 7.

TABLE 7

| Carrier Type | Optical Magnification (MO) | LF |
|---|---|---|
| 135AFC | 0.6 | 2.0 |
| | 0.8 | 2.8 |
| | 1.2 | 4.0 |
| 240AFC | 0.8 | 2.0 |
| | 1.0 | 2.8 |
| | 1.3 | 4.0 |

In step 158, the electronically changed magnification MEh in the main scanning direction is computed from the following formula.

$$MEh = MP \div MO \div \gamma$$

In step 160, the number of cut-out pixels in the main scanning direction is computed.

Namely, first, the number of pixels PPh within the print is determined from the following formula.

$$PPh = PSh \div P_o$$

Here, PSh is the print image size corresponding to the main scanning direction, and is obtained from the relationship between the long sides and the short sides of the print and the photographic film. Further, the print image size is defined as the size of the image to be scanned. Namely, in the case of a borderless print, the print image size is a value which includes the omitted portion. In the case of a bordered print which will be described later, the print image size is a value from which the border portions are subtracted.

By dividing the pixels PPh within the print by the electronically changed magnification MEh, the number of cut-out pixels IPh in the main scanning direction is determined. Namely, IPh is determined by the following formula.

$$IPh = PPh \div MEh$$

In step 161, the basic charge accumulating time is determined from Table 8 in accordance with the optical magnification MO.

TABLE 8

| Carrier Type | Optical Magnification (MO) | ET |
|---|---|---|
| 135AFC | 0.6 | 0.422 |
| | 0.8 | 0.524 |
| | 1.2 | 1.009 |
| 240AFC | 0.8 | 0.534 |
| | 1.0 | 0.647 |
| | 1.3 | 1.103 |

In step 162, given that the reading time of one line is ET, the subscanning speed (the conveying speed of the photographic film) in a case in which the electronically changed magnification MEh is 100% is determined. Namely, the length of one line on the photographic film corresponding to one line on the print is $P_o \div MP$, and the reading time thereof is ET. Thus, the subscanning speed CSF1 is $$CSF1 = (P_o \div MT) \div ET \times 1000.$$

Then, a basic subscanning speed CSF is selected from Table 9 which is the subscanning speed selection table.

TABLE 9

| Carrier Type | Conditions for Judgement | Basic Subscanning Speed (CSF) |
|---|---|---|
| 135 AFC | 32.5 ≦ CSF1 | 32.5 |
|  | 24.7 ≦ CSF1 < 32.5 | 24.7 |
|  | 15.0 ≦ CSF1 < 24.7 | 15.0 |
|  | 10.0 ≦ CSF1 < 15.0 | 10.0 |
|  | 7.0 ≦ CSF1 < 10.0 | 7.0 |
|  | 5.5 ≦ CSF1 < 7.0 | 5.5 |
|  | 3.0 ≦ CSF1 < 5.5 | 3.0 |
|  | CSF1 < 3.0 | 2.5 |
| 240 AFC (C,H) | 20.0 ≦ CSF1 | 20.0 |
|  | 10.0 ≦ CSF1 < 20.0 | 10.0 |
|  | 6.5 ≦ CSF1 < 10.0 | 6.5 |
|  | 4.5 ≦ CSF1 < 6.5 | 4.5 |
|  | 3.0 ≦ CSF1 < 4.5 | 3.0 |
|  | CSF1 < 3.0 | 2.0 |
| 240 AFC (P) | 15.0 < CSF1 | 20.0 |
|  | 8.0 ≦ CSF1 < 15.0 | 10.0 |
|  | 5.8 ≦ CSF1 < 8.0 | 6.5 |
|  | 4.0 ≦ CSF1 < 5.8 | 4.5 |
|  | 3.0 < CSF1 < 4.0 | 3.0 |
|  | CSF1 < 3.0 | 2.0 |

However, the basic subscanning speed CSF is within the upper limit values listed in Table 10.

TABLE 10

| Carrier Type | Film Size | Optical Magnification (MO) | Upper Limit Value of CSF |
|---|---|---|---|
| 135 AFC | 135F | 0.6 | none |
|  |  | 0.8 | 15.0 |
|  |  | 1.2 | 7.0 |
|  | 135P | 0.6 | 24.7 |
|  |  | 0.8 | 10.0 |
|  |  | 1.2 | 7.0 |
|  | 135HV | 0.6 | 24.7 |
|  |  | 0.8 | 10.0 |
|  |  | 1.2 | 7.0 |
|  | 135H | 0.8 | 10.0 |
|  |  | 1.2 | 7.0 |
| 240 AFC | 240(C) | 0.8 | none |
|  | 240(H) | 1.0 | 10.0 |
|  |  | 1.3 | 6.5 |
|  | 240(F) | 0.8 | none |
|  |  | 1.0 | 10.0 |
|  |  | 1.3 | 6.5 |

In step 164, the reading period RC is calculated by the following formula.

$$RC = ET \times CSF1 \div CSK \times 0.9$$

However, from the standpoint of image quality, in a case in which the density of reading is 1600 dpi or less, the reading period is forcibly set to a value which allows the density of reading to become 1600 dpi. Namely, when $$25.4 \div (CSk \times RC \div 1000) < 1600,$$

that is, when $$RC > 25.4 \div CSk \times 1000\ 1600,$$

then RC is set as follows:

$$RC = 25.4 \div CSk \times 1000 \div 1600.$$

When the computed reading period RC is less than 0.422, RC=0.422.

Further, because the reading period must be greater than or equal to the time for writing one line onto the FM, if RC<FM writing time, then the following relationship is set:

RC=FM writing time.

The FM writing time is determined from the following formula and is truncated to three decimal places.

$$FM \text{ writing time} = PPh \div (FM \text{ writing speed}) \times (\text{stability factor}) = PPh \div 4000 \text{ (pixel/msec)} \times 1.1$$

In the present embodiment, there is no need to consider the speed for writing into the index memory as this speed is ensured by the hardware.

In step 166, the subscanning direction electronic magnification is computed. Namely, the line interval at the input side is $CSk \times RC \div 1000$ (mm), and the subscanning direction electronically changed magnification MEv is computed by the following formula. Because this electronically changed magnification MEv is set in units of 0.1%, it is rounded up to three decimal places.

$$MEv = MP \div (P_o \div (CSk \times RC \div 1000))$$

In step 168, the number of cut-out pixels in the subscanning direction is computed. Namely, first, the pixels PPv within the print are calculated by the following formula.

$$PPv = PSv \div P_o$$

Then, by dividing the pixels PPv within the print by the subscanning direction electronically changed magnification MEv, the subscanning direction number of cut-out pixels IPv is calculated. Namely, $$IPv = PPv \div MEv$$

In step 170, the light source diaphragm value is computed. The maximum light amounts obtained by the results of set-up calculation (i.e., the densities of the image obtained by prescanning) are $D_{xr}$, $D_{xg}$, $D_{xb}$. The device light amounts (densities) corresponding to the basic charge accumulating times obtained by the lightness correction are $D_{fr}$, $D_{fg}$, $D_{fb}$. The device light amounts (densities) corresponding to the reading period are determined by the following formulas. Note that all of these values are rounded up to three decimal places.

$$D_{fr}1 = D_{fr} \times RC \div ET$$

$$D_{fg}1 = D_{fg} \times RC \div ET$$

$$D_{fb}1 = D_{fb} \times RC \div ET$$

The adjusted light amount (density) $D_{vol}$ is derived by the following formula.

$$D_{vol} = MIN(D_{fr}1 - D_{xr}, D_{fg}1 - D_{xg}, D_{fb}1 - D_{xb})$$

Then, the light source diaphragm amount is determined from following Table 11.

TABLE 11

| Conditions for Judgement | Light Source Diaphragm Amount ($D_{CNT}$) |
|---|---|
| $D_{vol} < 0.3$ | 0.0 |
| $0.3 \leq D_{vol} < 0.6$ | 0.3 |
| $0.6 \leq D_{vol} < 0.9$ | 0.6 |
| $0.9 \leq D_{vol}$ | 0.9 |

In step 172, the charge accumulating times are calculated. Namely, implementation values Dvr, Dvg, Dvb of the respective colors and corresponding to the light source diaphragm amount $D_{CNT}$ are obtained from the diaphragm table given above. Then, the respective charge accumulating times EThr, EThg and EThb are computed from the following formulas.

$$EThr = RC \times (-\log(D_{vol} - D_{CNT} + D_{vr} - D_{CNT}))$$

$$EThg = RC \times (-\log(D_{vol} - D_{CNT} + D_{vg} - D_{CNT}))$$

$$EThb = RC \times (-\log(D_{vol} - D_{CNT} + D_{vb} - D_{CNT}))$$

Here, if the charge accumulating time exceeds the reading period, the charge accumulating time is forcibly set to the reading period. Namely, if EThr>RC, then EThr=RC;
if EThg>RC, then EThg=RC;
if EThb>RC, then EThb=RC.

Further, if $D_{fb} - D_{xb} \leq 0.5$, then the B gain is set to 3×.

In this way, the optical magnification corresponding to the print magnification, the lens F value corresponding to the optical magnification, the basic charge accumulating time corresponding to the optical magnification, the basic subscanning speed corresponding to the print magnification and the basic charge accumulating time, the reading period corresponding to the basic charge accumulating time and the basic subscanning speed, the light source diaphragm value corresponding to the adjusted light amount (density) determined in consideration of the basic charge accumulating time and the reading period, and the charge accumulating time corresponding to the reading period and the light source diaphragm value, are determined by the above-described fine scan conditions computing processing. Also, by the above-described fine scan conditions computing processing, the number of cut-out pixels (for both the main scanning direction and the subscanning direction) is determined from the electronically changed magnification which is determined in accordance with the print magnification and the optical magnification. Thus, the fine scan conditions are computed in accordance with the print magnification.

Hereinafter, a representative example of results of computation in the borderless mode (for a 135 AFC carrier) is given.

$MP = 3.880$ $MO1 = MP \div \gamma = 3.880 \div 10.583 = 0.366$ optical magnification $MO = 0.6$ electronically changed magnification
$MEh$ for main scanning direction $= MP \div MO \div \gamma$
$= 3.880 \div 0.6 \div 10.583$
$= 0.612$ pixels $PPh$ within print $= PSh \div P_o$
$= (89 + 2.5) \div 0.08467$
$= 1080$ main scanning number of
cut-out pixels $IPh$ $= PPh \div MEh$
$= 1080 \div 0.612$
$= 1764$ basic charge accumulating time $ET = 0.422$ subscanning speed $CSF1 = (P_o \div MP) \div ET \times 1000$
$= (0.08467 \div 3.880) \div 0.422 \times 1000$
$= 51.8$ basic subscanning speed $CSF = 32.5$ reading period $RC = ET \times CSF1 \div CSk \times 0.9$
$= 0.422 \times 51.8 \div 32.5 \times 0.9$
$= 0.605$ reading period $RC = 25.4 \div 32.5 \times 1000 \div 1600$
$= 0.488$ FM writing time $= PPh \div 4 \div 1000 \times 1.1$
$= 1080 \div 4 \div 1000 \times 1.1$
$= 0.297$ electronically changed
magnification $MEv$ for $= MP \div (P_o \div (CFS \times RC \div 1000))$
subscanning direction
$= 3.880 \div (0.08467 \div (32.5 \times$
$0.488 \div 1000))$
$= 0.727$ pixels $PPv$ within print $= PSv \div P_o$
$= (127 + 2.5) \div 0.08467$
$= 1529$ subscanning direction number
of cut-out pixels $IPv$ $= PPv \div MEv$
$= 1529 \div 0.727$
$= 2103$ $LC1 = 96 \div CSk \div MO \div RC$
$= 96 \div 32.5 \div 0.6 \div 0.488$
$= 10.088$ $LCa = 10$ $LCb = 0.088$ The above is an example of borderless mode processing. Because fine scan conditions for the bordered mode of step 148 (see FIG. 9) and the trimming mode of step 150 are computed in substantially the same way as above, detailed description thereof will be omitted, and only the portions that differ will be explained.

In the case of bordered mode processing, only the following two items differ from the borderless mode processing.

The first is the print size.

As described previously, the print size in the bordered mode is, in terms of calculation, a print size whose length (image dimension) is the finished size minus the border amount.

For example, given that the print size is PSx=89 mm and PSy=127 mm and the border amount is Fh=4 mm and Fv=4 mm (for one side), the print size in terms of calculation is $PSh = PSx - 2 \times Fh = 81$ mm $PSv = PSy - 2 \times Fv = 119$ mm The second item of the bordered mode processing that differs from the borderless mode processing is the output omitted portion amount. Namely, factors such as paper meandering and dispersion of cutting are called O (Ox, Oy).

In the case of trimming mode processing, on the basis of the print magnification obtained by the trimming operation, the optical magnification is set so as to be given priority, and the electrical magnification is suppressed to as low as possible around 100%. The other processings are carried out in accordance with the method of determining the fine scan conditions of the borderless mode processing. Further, the optical magnification is set so as to be in steps. For example, in the case of 135 AFC, the optical magnification is set to one of 0.6, 0.8, 1.0, 1.2 and 1.3. However, in cases such as when the magnification is very large, or the trimming rate is very large, when the printing magnification becomes very large (e.g., 20 times or more), printing is possible, and there are no limits on image quality.

The basic charge accumulating time for size combinations other than the borderless mode processing when a 135 AFC is used is derived relatively by using as a reference a basic charge accumulating time $ET_o$ for borderless mode processing (for a case in which a 135 AFC is used).

Namely, the lens F value is obtained from the lens diaphragm table of Table 12, in accordance with the optical magnification MO.

TABLE 12

(for 135 AFC)

| Optical Magnification (MO) | LF |
|---|---|
| 0.6 | 2.0 |
| 0.8 | 2.8 |
| 1.2 | 4.0 |

Because the amount of light changes in accordance with the type of mirror box, the coefficient (MB) is obtained, from Table 13, in accordance with the type of mirror box.

TABLE 13

| Mirror Box Type | For 135F or Less | For 120 |
|---|---|---|
| Coefficient (MB) | 1 | 0.4 |

By using the above three types of parameters, the charge accumulating time is determined as follows.

$ET1 = ET0 \times (LF \times (1+MO))^2 \div (LF0 \times (1+MO0))^2 \div MB$

Here, in the borderless mode processing, LF0=2.0, and MO0=0.6.

In accordance with the optical magnification, the margin of the light amount is obtained from Table 14.

TABLE 14

| Optical Magnification (MO) | Light Amount Margin (KY) |
|---|---|
| 0.6 | 1.20 |
| 0.8 | 0.95 |
| 1.2 | 0.95 |

The basic charge accumulation time is calculated as follows.

$ET = (ET1 \div 10^{(KY0-KY) \cdot 1000}) \div 1000$

Here, KY0=1.20.

As described above, when the fine scan conditions are computed, in step 116 (see FIG. 7), a determination is made as to whether or not it is necessary to shift to the high-density reading mode. Namely, even in a case in which fine scanning is carried out under the above fine scan conditions, a determination is made as to whether or not it may not be possible to accurately read the image. For example, even in a case in which the photographic film is conveyed at the basic subscanning speed and the light source diaphragm is controlled in accordance with the light source diaphragm value and the light amount is accumulated for the above accumulating time, there are cases in which the density of the image of the photographic film is greater than or equal to a predetermined value, and in cases in which the image cannot be read properly, the high-density reading mode is executed in step 118. Note that step 116 corresponds to the reading determining means. On the other hand, in a case in which the image can be read appropriately, in step 120, fine scanning under the above fine scanning conditions is carried out. Namely, the photographic film 22, which has been conveyed up to the leading end thereof by the prescanning, is conveyed in the opposite direction to the prescanning, and the images recorded on the photographic film 22 are fine scanned frame by frame at optimal exposure conditions (the above fine scan conditions). Namely, the respective sections (the film carrier, the reading section driving motor 58, the lens driving motor 60, the diaphragm driving motor 56, the CCD line sensor 116, and the like) are controlled such that the fine scanning conditions are the above fine scanning conditions.

Next, the high-density reading mode will be described with reference to the high-density reading mode processing routine of FIG. 11. Hereinafter, explanation will be given with a 135 AFC used as an example, but other cases as well are subjected to the same type of processing.

Figure 11:
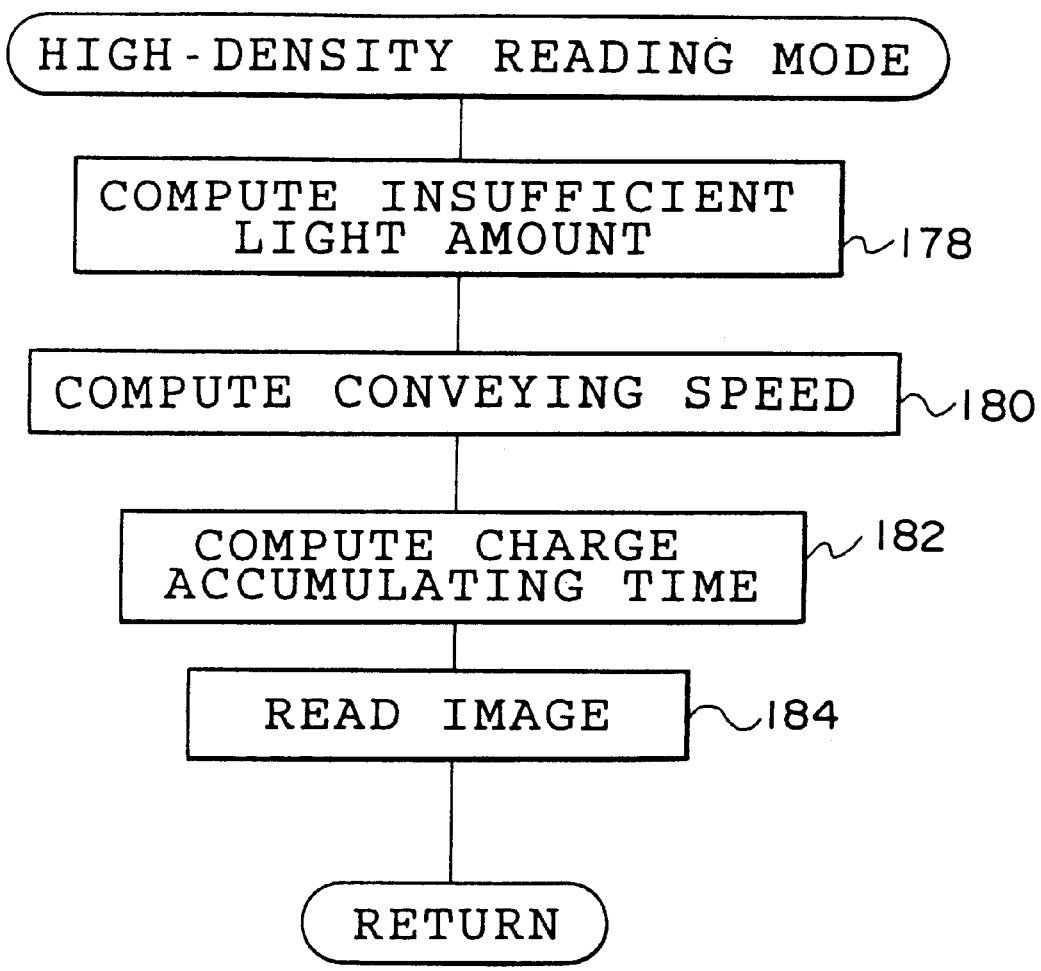
FIG. 11 is a flowchart illustrating a high-density reading mode processing routine.

In step 178 of FIG. 11, the insufficient amount of light, which is determined by the density of the image obtained during prescanning, is computed. Namely, because the density of the image is greater than or equal to a predetermined value, the image cannot be read properly at the present light amount. Thus, the insufficient amount of light is computed by subtracting the amount of light at the time of prescanning from the amount of light which is needed for properly reading the image and which is determined on the basis of the density of the image. For example, given that the correction amount determined by set up computation (i.e., the amount of light which is needed to properly read the image and which is determined on the basis of the density of the image) is Ds and the correction margin amount at the time of prescan (the light source diaphragm position (corresponding to the length of the diameter of the opening)) is Dy, then the insufficient light amount Dh is Dh=Ds−Dy.

For example, if Ds=0.7 and Dy=0.3, then the insufficient amount of light Dh is $$Dh = Ds - Dy = 0.4.$$

In step 180, the conveying speed (the second conveying speed of the present invention) is computed. Namely, given that the conveying speed CSf in the regular mode is CSf=32.5 mm/sec, the necessary conveying speed CSk1 is $$\begin{aligned} Csk1 &= CSf \times (-\log(Dh)) \\ &= 32.5 \times (-\log(0.4)) \\ &= 12.93 \end{aligned}$$

Namely, the conveying speed CSk1 is a speed which is slower than the conveying speed CSf in the regular mode. Then, from the following group of values, the maximum value (mm/sec) which does not exceed CSk1 is selected.

32.5/24.7/15/10/7/5.5/3/2.5

In this case, CSk=10 mm/sec.

In step 182, the charge accumulating time (the second reading period of time of the present invention) is calculated. Namely, given that the charge accumulating time ET in the bordered mode is ET=0.422 msec, the necessary charge accumulating time ETk is:

$$\begin{aligned} ETk &= ET \times CSf \div CSk \\ &= 0.422 \times 32.5 \div 10 \\ &= 1.372 \text{ msec} \end{aligned}$$

Namely, the charge accumulating time ETk is a time which is longer than the charge accumulating time ET in the bordered mode.

In step 184, the image is read while the photographic film is conveyed at the above-calculated conveying speed (CSk) and the light amount is accumulated for the above-calculated accumulating time (ETk).

In this way, even if fine scanning is carried out under the above fine scanning conditions, in a case in which an image cannot be read properly (i.e., in a case in which the density of the image of the photographic film is greater than or equal to a predetermined value), the conveying speed is made to be slower than the conveying speed in the ordinary mode (the first conveying speed of the present invention), and the charge accumulating time is made to be longer than the ordinary charge accumulating time (the first reading period of time of the present invention). Therefore, even if the density of the image is a predetermined value or more, the image can be read well. However, if it is possible to read the image well by carrying out only one of making the conveying speed slower than the conveying speed in the ordinary mode or making the charge accumulating time longer than the ordinary charge accumulating time, it is permissible to carry out one of making the conveying speed slower and making the charge accumulating time longer.

In a case in which an image cannot be read properly even if fine scanning is carried out under the above fine scan conditions, the conveying speed is made to be slower than the conveying speed in the ordinary mode, the charge accumulating time is made to be longer than the ordinary charge accumulating time, and the amount of light illuminated onto the photographic film (the position of the light source diaphragm) is made constant. However, the present invention is not limited to the same, and the amount of light illuminated onto the photographic film may be greater than the aforementioned amount of illuminated light (i.e., the light source diaphragm amount may be made smaller).

Namely, for example, as described above, the correction amount determined by set up computation Ds=0.7 and the correction margin amount at the time of prescan Dy=0.3 are obtained. Thereafter, if the correction margin amount at the time of prescan (corresponding to the length of the diameter of the opening) Dy is a value greater than the aforementioned value (i.e., is a value which makes the amount of light illuminated onto the photographic film greater than the aforementioned amount of illuminated light), for example, if Dy=0.5, then the insufficient amount of light Dh is $$Dh = Ds - Dy = 0.2.$$

Namely, because the length of the diameter of the opening is made greater, the insufficient light amount becomes relatively smaller.

In step 180, the conveying speed CSk1 is calculated as follows:

$$\begin{aligned} CSk1 &= CSf \times (-\log(Dh)) \; . \\ &= 32.5 \times (-\log(0.2)) \\ &= 22.7 \end{aligned}$$

Thus, CSk=24.7 mm/sec, which is faster than the aforementioned conveying speed (10 mm/sec).

In step 182, the charge accumulating time is calculated as follows:

$$\begin{aligned} ETk &= ET \times CSf \div CSk \quad . \\ &= 0.422 \times 32.5 \div 22.7 \\ &= 0.604 \text{ msec} \end{aligned}$$

Then, in step 184, the opening diameter is increased as described above, and the image is read while the photographic film is conveyed at the above-calculated conveying speed (24.7 mm/sec) and the light amount is accumulated for the above-calculated charge accumulating time (0.604 msec).

In this way, an amount of light, which is greater than the amount of light illuminated onto the photographic film at the time the density of the image is determined, is determined. On the basis of this amount of light, the conveying speed for reading the image properly is determined. The determined amount of light is illuminated onto the photographic photosensitive material, and the photographic film is conveyed at the conveying speed determined on the basis of the amount of light. Thus, even if the density of the image is greater than or equal to a predetermined value, the image can be read properly, the conveying speed can be made relatively fast, and the processing time can be shortened.

In the above-described example, on the basis of the above amount of light, the conveying speed and reading period of time for properly reading the image are determined. The determined amount of light is illuminated onto the photographic photosensitive material, the photographic film is conveyed at the conveying speed determined on the basis of the above amount of light, and the image is read for a reading period of time determined on the basis of the above amount of light. However, the present invention is not limited to the same, and it is possible to determine only one of the conveying speed and the reading period of time on the basis of the above light amount. Here, in a case in which the conveying speed is determined on the basis of the above amount of light, the photographic film is conveyed at the determined conveying speed, whereas in a case in which the reading period of time is determined on the basis of the above amount of light, the image is read at the determined reading period of time.

In the above description, an amount of light, which is greater than the amount of light illuminated onto the photographic film at the time the density of the image is determined, is determined. However, the present invention is not limited to the same, and an amount of light which is smaller may be determined.

The image signals obtained by reading as described above are amplified by the amplifiers 76 and converted to digital data (image data) by the A/D converters 82.

Figure 27:
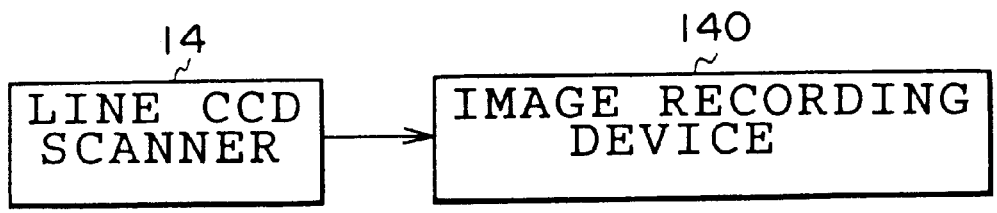
FIG. 27 is a block view of an image forming system of the present embodiment.

In this image data, deviation of the main scanning direction lines read by the three-line CCD 116 (i.e., so-called color offset) is corrected by the CDSs 88, and the corrected data is inputted to the image processing section 16 via the interface (I/F) circuit 90. The data is converted into a predetermined number of pixels by an expansion/compression circuit (not shown) within the image processing section 16 so as to obtain the final image data. This image data is transmitted to an image recording device 140 (see FIG. 27) where the image is scanned and exposed onto a photographic printing paper. By subjecting the photographic printing paper to developing processing, a desired photographic print is obtained. Namely, an image forming system is structured by the line CCD scanner 14 and the image recording device 140.

Figure 19:
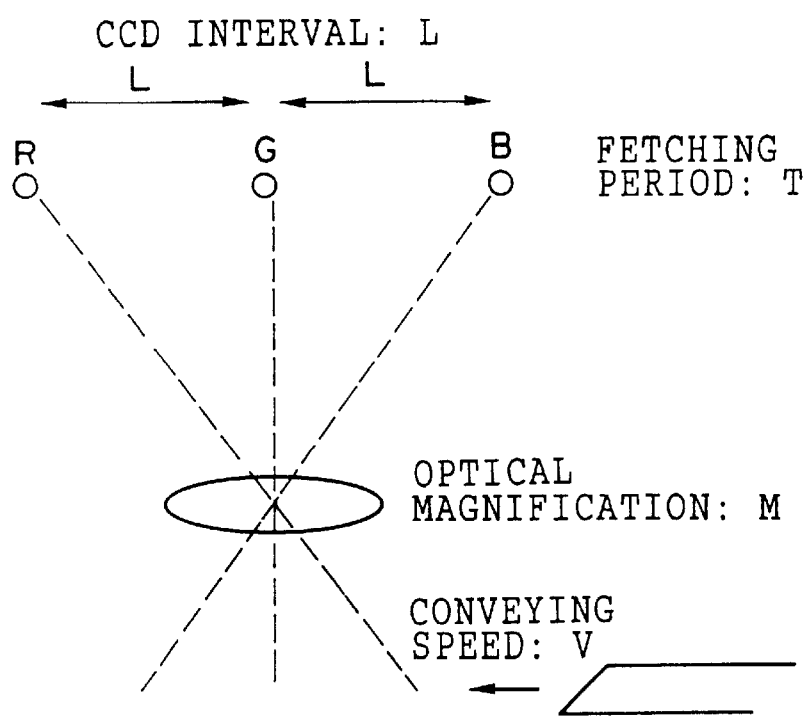
FIG. 19 is a view illustrating the arrangement of R, C, and B CCD line sensors.

Next, correction of the aforementioned color offset will be described in detail. In FIG. 19, an arrangement in the case of prescanning of 135 AFC and 240 AFC (MFC fine scanning) is illustrated.

Figure 20:
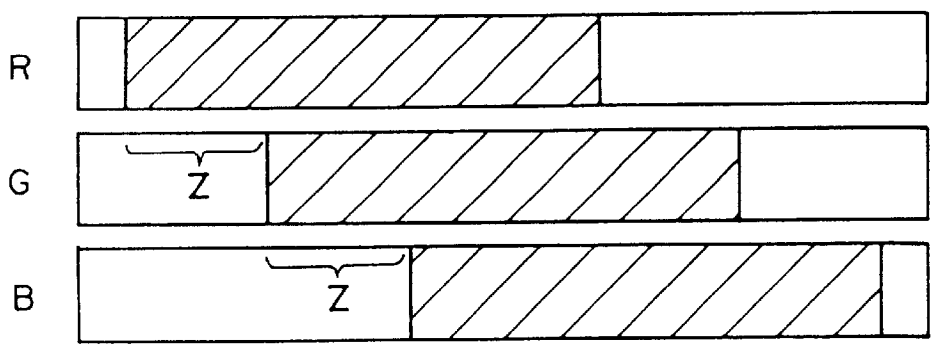
FIG. 20 is a schematic view illustrating image data of the respective CCD line sensors at the time when no color offset correction is carried out.

An image which is obtained in a case in which color offset is not corrected is as shown in FIG. 20. Namely, the offset amount Z of each color is calculated by the following formula.

$$Z = L \div (V \times M) + T$$

The value a is the integer obtained by rounding Z to the nearest integer, and Z−a=b (b is a decimal value).

As described above, correction per line is carried out by the CDS 88. The line correction amounts (R, G, B) set by the CDSs 88 are as shown in following Table 15.

TABLE 15

|  | Prescan | Fine Scan |
| --- | --- | --- |
| 135AFC, 240AFC | (2 × a, a, 0) | (0, a, 2 × a) |
| MFC | (0, a, 2 × a) | (2 × a, a, 0) |

Figure 21:
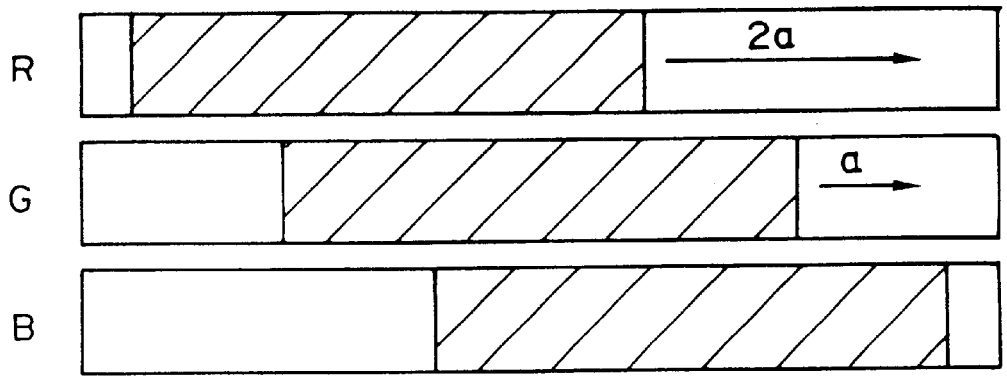
FIG. 21 is a view illustrating correction of an amount of color offset per line.

In this way, as illustrated in FIG. 21, the reading timing of the R image data is delayed by 2a, and the reading time of the G image data is delayed by a.

Next, correction of the decimal portions by the expansion/compression circuit (not shown) within the image processing section 16 is carried out.

Namely, the correction values (R, G, B) set by the expansion/compression circuit are as shown in following Table 16.

TABLE 16

|  | Prescan | Fine Scan |
| --- | --- | --- |
| 135AFC, 240AFC | (b, 0, −b) | (−b, 0, b) |
| MFC | (−b, 0, b) | (b, 0, −b) |

In the hardware, values are set in the register in units of $\frac{1}{16}$ of a pixel.

Figure 22:
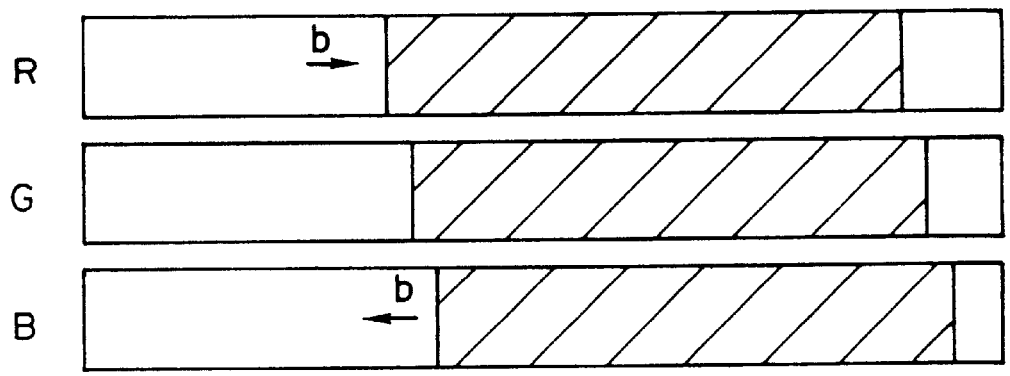
FIG. 22 is a view illustrating correction of an amount of color offset smaller than one pixel.

In this way, as illustrated in FIG. 22, the reading timing of the R image data is delayed by b, and the reading timing of the B image data is advanced by b.

Figure 23:
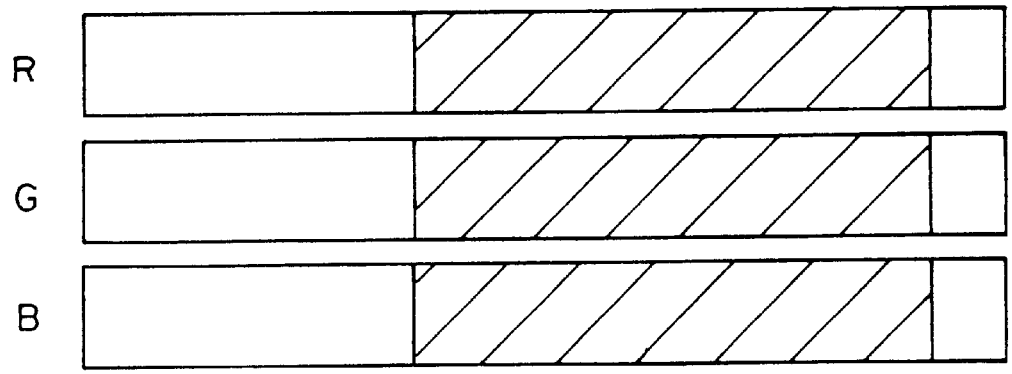
FIG. 23 is a schematic view illustrating image data of the respective CCD line sensors after color offset correction.

Thus, as illustrated in FIG. 23, the color offset can be corrected to within $\frac{1}{16}$ of a pixel.

Here, the correction of the color offset which is carried out by the scanner section is carried out by hardware. However, because of constraints of the hardware, the G correction must be made smaller than, for example, 24 lines (R and B must be made smaller than, for example, 48 lines). Namely, the condition a<24 must be satisfied. If this condition is not satisfied, the algorithms or the hardware specifications must be corrected so that this condition is satisfied.

Next, the index print will be described. The print magnification of the frame images in the index print is processed in the same way as the above-described bordered prints. However, the index print processing does not include concepts such as fine adjustment of the print magnification and trimming, and usually, printing is carried out at a standard print magnification. Further, the index print is not affected by the size of the actual prints and the print magnification.

For example, in the case of a 135 size photographic film, the shortest side of the frame images on the index print is PX and the longest side is PY. Further, the standard scannable range is 23.6 mm×34.8 mm.

The print magnification is determined as follows.

$$MAX(PY/34.8, PX/23.6)$$

Further, the print image size for the index print is PSih for the main scanning direction and PSiv for the subscanning direction. The number of print pixels for the index print is determined by the following formula (wherein the decimals (the numbers to the right of the decimal point) are eliminated).

$$PPih = PSih \div POPPiv = PSiv \div P0$$

The print magnification for the index print is MPi. The number of cut-out pixels Ipih in the main scanning direction is calculated by the following formula (wherein the decimals are eliminated).

$$IPih = Psih \div MPi \times MO \div 0.008$$

The number of cut-out pixels IPiv in the subscanning direction is calculated by the following formula (wherein the decimals are eliminated).

$$IPiv = Psiv \div MPi \div CSk \div RC$$

Here, when the number of cut-out pixels for the index print is larger than the number of cut-out pixels of the actual print, cutting out until the size for the index print is carried out at the scanner section, and at the image processing section, an area necessary for the actual print is further cut-out. Conversely, when the number of cut-out pixels for the index print is smaller than the number of cut-out pixels of the actual print, cutting out until the size for the actual print is carried out at the scanner section, and cutting out until the size for the index print is carried out by software at the PC section.

Next, processing for verifying the algorithm will be described. In the algorithm verification processing, based on the above fine scan conditions, a determination is made as to whether or not reading of the image of the photographic film has been completed properly. If reading has not be completed properly, an error message is a.displayed. The following verification processing is carried out each time a predetermined period of time passes.

Electronically Changed Magnification

The relationships illustrated in following Table 17 are established between the image quality MTF and the electronically changed magnifications in the main scanning direction and the subscanning direction computed by the above-described processing.

TABLE 17

| Main Scanning Direction Electronically Changed Magnification (MEh) | Subscanning Direction Electronically Changed Magnification (MEv) | MTF | Moiré |
|---|---|---|---|
| MEh < 95% | MBv < 95% | ○ | ○ |
| 95% ≦ MEh ≦ 105% | 95% ≦ MEv ≦ 105% | Δ | Δ |
| 105% ≦ MEh ≦ 130% | 105% < MEv ≦ 120% | Δ | ○ |
| 130% ≦ MEh | 120% < MEv | X | ○ |

○: no problems
Δ: problems arising due to the image, and therefore should be avoided
X: problems arising with respect to image quality, and therefore should be avoided In the present embodiment, the above relationships are stored, and a determination as to whether or not the required image quality can be obtained is made on the basis of the stored relationships and the electronically changed magnifications in the main scanning direction and the subscanning direction computed by the above-described processing. If it is determined that the required image quality cannot be attained, a message suitable for a case in which the required image quality cannot be achieved is displayed on the display 18. Then, the algorithm or the specifications of the hardware are corrected.

Memory Capacity

The number of pixels of image data outputted to an unillustrated printer are:

main scanning direction number of output pixels ($OPh$)=main scanning direction number of cut-out pixels ($IPh$)×main scanning direction electronically changed magnification ($MEh$)

subscanning direction number of output pixels ($OPv$)=subscanning direction number of cut-out pixels ($IPv$)×sub-scanning direction electronically changed magnification ($MEv$)

The size of the image data accumulated in the FM is determined by the larger of the following.

$Sfm$=(main scanning direction number of output pixels)×(sub-scanning direction number of cut-out pixels)=($OPh$)×($IPv$)

and $Sfm$=(main scanning direction number of output pixels)×(sub-scanning direction number of cut-out pixels for index print)= ($OPh$)×($IPiv$).

Further, the size of the image data accumulated in the TM is determined by the following formula.

$Stm$=(main scanning direction number of output pixels)×(sub-scanning direction number of output pixels)=($OPh$)×($OPv$)

From these values, the following determinations are carried out. Namely, it is determined whether the following inequalities are established.

$Sfm \leq 8M(8 \times 1024 \times 1024)$ and $Stm \leq 8M$

If these relationships are established, high speed processing by a double buffer is possible. If these relationships are not established, a determination is made as to whether or not the inequalities $Sfm \leq 20M$ and $Stm \leq 16M$ are established. If these relationships are established, processing by a single buffer is possible. If these relationships are not established, processing is not possible. Display to that effect is given on the display 18. Then, the algorithm or the specifications of the hardware may be corrected.

If the number of cut-out pixels for the index print is less than the number of cut-out pixels of the actual print, i.e., if printing is to be carried out at a magnification higher than the standard printing magnification, in the case of the maximum print size (which is double the size of 25.4 cm×30.5 cm), given that the subscanning direction electronically changed magnification is Mev, $Sfm$=4530×3030÷$MEv$÷1024÷1024=13.1÷$MEv$<20

Sfm=4530÷3030÷1024÷1024=13.1<16

If MEv>0.655, processing is not possible. However, if a large size print is to be formed at a magnification lower than the standard print magnification and an index print is to be simultaneously formed, there are cases in which the FM capacity will be exceeded. In such cases, an error message is displayed on the display 18, and the index print and the large size print are processed separately.

Image Processing Time

In the case of 135 AFC or 240 AFC, in order to process plural frames in continuous succession, the time required for image processing of a single frame includes the software overhead, and it is necessary for the time required for image processing of a single frame to be kept less than or equal to the time required for the scanning of one frame.

(processing time for one frame)+(software overhead)≦(scan time for one frame)

If the above relationship is not established, conveying is stopped per frame.

The processing time for one frame is determined from the following formula.

((main scanning direction number of output pixels)+(main scanning number of pipelines))×((subscanning direction number of output pixels)+(subscanning direction number of pipelines))÷(image processing speed)=($OPh$+250)×($OPv$+4)÷4

The software overhead is 0.2 seconds.
The scan time for one frame is determined by the following formula.

(pitch between frames)÷(subscanning speed)

If the required processing capability cannot be achieved due to the above relationships being not established, a display to that effect is given on the display 18. Then, the algorithm or the hardware specifications can be corrected.

Figure 25A:
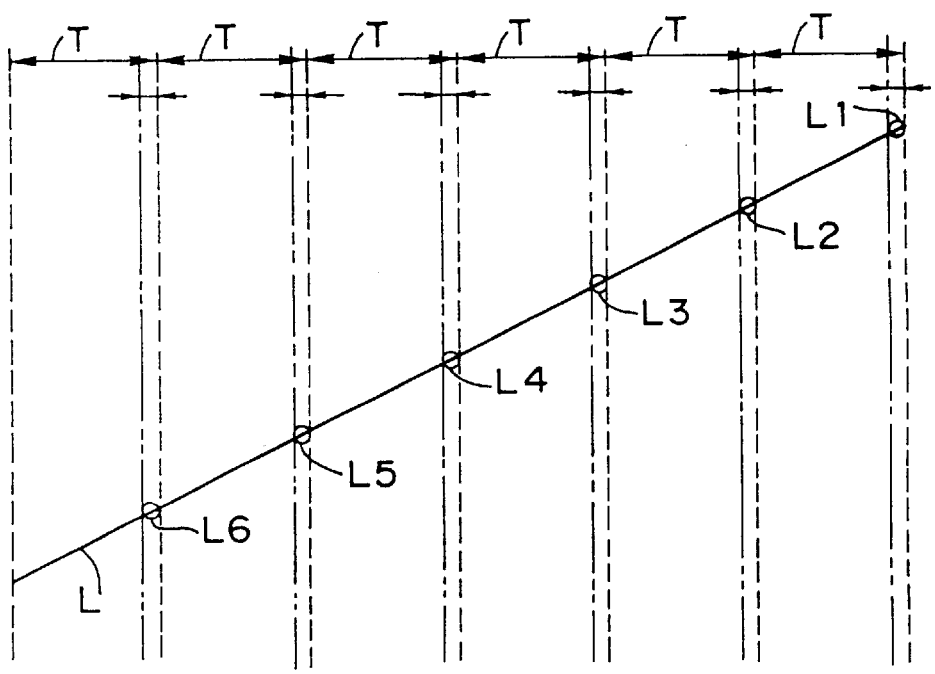
FIGS. 25A and 25B are view s for explaining a jagged image.
Figure 25B:
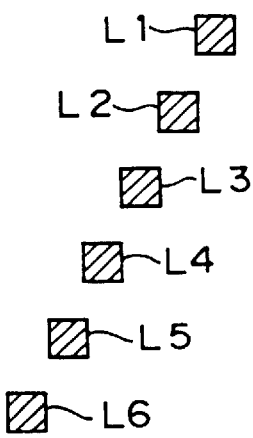

As illustrated in FIG. 25A, at the time when an image of a photographic film is read at charge accumulating time t within reading period T, if the ratio of the charge accumulating time t to the reading period T is less than a predetermined value (e.g., 1/16), the read image becomes a jagged image. Namely, for example, when the straight line L extending diagonally in FIG. 25A is read such that the above ratio is smaller than a predetermined value, the portions of the image read during each charge accumulating time t are L1, L2, . . . . When printing is carried out, as illustrated in FIG. 25B, the printed portions are not the straight line L, but are instead non-continuous images L1, L2, . . . .

Thus, in the present embodiment, the ratio of the charge accumulating time t to the reading period T is set to be greater than or equal to a predetermined value. Namely, the diaphragm amount of the light source diaphragm is forcibly set to a predetermined value, or the light amount passing through the ND filter is made smaller. Accordingly, the charge accumulating time t is made longer, and the aforementioned ratio is greater than or equal to a predetermined value.

Figure 4B:
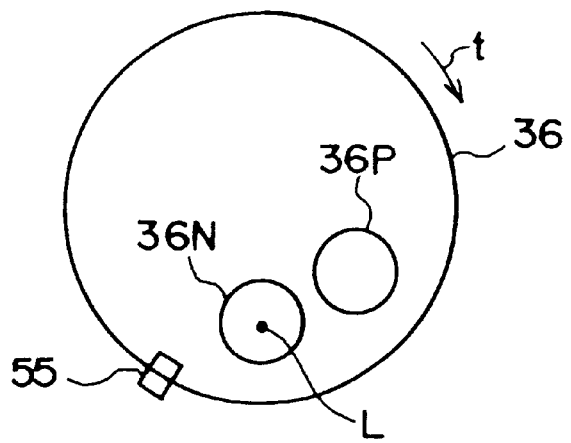
FIG. 4B is a plan view illustrating an example of a turret.
Figure 4C:
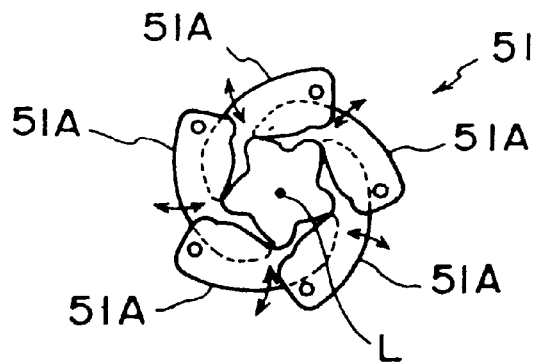
FIG. 4C is a plan view illustrating an example of a lens diaphragm.
Figure 4D:
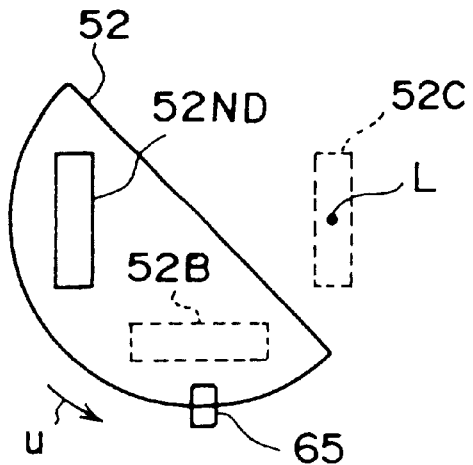
FIG. 4D is a plan view illustrating an example of a CCD shutter.
Figure 26:
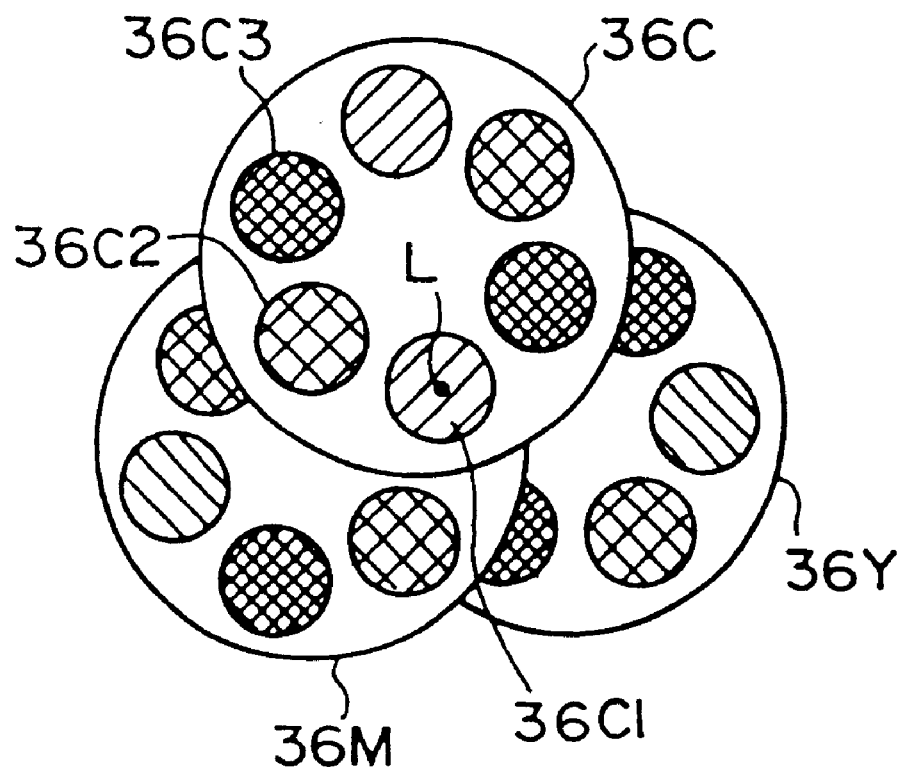
FIG. 26 is a view illustrating a variant example of a turret.

Note that the present invention is not limited to the previously-described turret (see FIG. 4B). As illustrated in FIG. 26, a turret 36C for cyan filters which absorb red light, a turret 36M for magenta filters which absorb green light, and a turret 36Y for yellow filters which absorb violet light may be used. A plurality of cyan filters 36C1, 36C2, 36C3 of different densities are fit into the turret 36C. The cyan filter 36C1 has the lowest density, the cyan filter 36C2 has an intermediate density, and the cyan filter 36C3 has the highest density. The other turrets 36M, 36Y are structured in the same way. The respective turrets 36C, 36M, 36Y are supported rotatably such that the selected filters of the respective turrets are disposed on the optical axis L.

What is claimed is:

1. An image reading device comprising:

a conveying device able to convey a photographic photosensitive material, on which an image is recorded, at a first conveying speed and a second conveying speed which is slower than the first conveying speed;

a reading device able to read the image of the photographic photosensitive material, which is conveyed by said conveying device, for a first reading period of time and a second reading period of time which is longer than the first reading period of time;

reading determining means for determining whether or not the image can be read properly, on the basis of a density of the image at the time the image of the photographic photosensitive material conveyed by said conveying device at the first conveying spped is read by said reading device for the first reading period of time; and a control device for, in a case in which said reading determining means determines that the image cannot be read properly, carrying out at least one of a first control, in which said conveying device is controlled to convey the photographic photosensitive material at the second conveying speed, and a second control, in which said reading device is controlled to read the image of the photographic photosensitive material for the second reading period of time;

wherein the second conveying speed is determined on the basis of the density of the image at the time the image of the photographic photosensitive material conveyed at the first conveying speed is read for the first reading period of time, and the second reading period of time is determined on the basis of the second conveying speed.

2. An image reading device according claim 1, wherein in a case in which said reading determining means determines that the image can be read properly, on the basis of the density of the image at the time the image of the photographic photosensitive material conveyed at the first conveying speed is read for the first reading period of time, said control device control said conveying device and said reading device such that the image of the photographic photosensitive material is subjected to a main reading.

3. An image reading device according to claim 1, wherein said control device controls said conveying device and said reading device such that the image is subjected to a preliminary reading and is subjected to a main reading on the basis of the results of the preliminary reading.

4. An image reading device according to claim 3, wherein on the basis of the results of the preliminary reading, said reading determining means determines whether or not the image can be properly read.

5. An image forming system comprising:

said image reading device according to claim 1; and an image recording device which produces photographic prints on the basis of image data obtained by reading by said image reading device.

6. An image reading device according to claim 1, wherein the second conveying speed is calculated from a logarithmic function of density information of the read image, and the second reading period of time is calculated from the second conveying speed.

7. An image reading device according to claim 6, wherein the second conveying speed is determined according to the logarithmic function when a scanning of the image under a fine scan condition results in a high density output.

8. An image reading device according to claim 1, farther comprising:

detecting means for detecting a type of the photographic photosensitive material, wherein said conveying device determines the first conveying speed in accordance with the type of the photographic photosensitive material detected by said detecting means, and said reading device determines the first reading period of time in accordance with the type of the photographic photosensitive material detected by said detecting means.

9. An image reading method comprising the steps of:

reading an image of a photographic photosensitive material at a first reading period of time while the photographic photosensitive material is conveyed at a first conveying speed;

determining, on the basis of a density of the image obtained by said reading, whether or not the image can be properly read; and in a case in which it is determined that the image cannot be properly read, effecting at least one of a first control, in which the photographic photosensitive material is conveyed at a second conveying speed which is slower than the first conveying speed, and a second control, in which the image of the photographic photosensitive material is read for a second reading period of time which is longer than the first reading period of time;

wherein the second conveying speed is determined on the basis of the density of the image at the time the image of the photographic photosensitive material conveyed at the first conveying speed is read for the first reading period of time, and the second reading period of time is determined on the basis of the second conveying speed.

10. An image reading method according to claim 9, wherein in a case in which it is determined that the image can be read properly, on the basis of the density of the image at the time the image of the photographic photosensitive material conveyed at the first conveying speed is read for the first reading period of time, the image of the photographic photosensitive material is subjected to a main reading.

11. An image reading method according to claim 9, wherein the image is subjected to a preliminary reading and is subjected to a main reading on the basis of the results of the preliminary reading.

12. An image reading method according to claim 11, wherein on the basis of the results of the preliminary reading, it is determined whether or not the image can be properly read.

13. An image reading method according to claim 9, wherein the second conveying speed is calculated from a logarithmic function of density information of the read image, and the second reading period of time is calculated from the second conveying speed.

14. An image reading method according to claim 13, wherein the second conveying speed is determined according to the logarithmic function when a scanning of the image under a fine scan condition results in a high density output.

15. An image reading method according to claim 9, wherein a type of the photographic photosensitive material is detected, and the first conveying speed is determined in accordance with the detected type of the photographic photosensitive material, and the first reading period of time is determined in accordance with the detected type of the photographic photosensitive material.

16. An image reading device comprising:
a conveying device for conveying a photographic photosensitive material on which an image is recorded;
a reading device for reading the image of the photographic photosensitive material conveyed by said conveying device;
determining means for determining a conveying speed at which the image can be read properly, on the basis of a density of the image of the photographic photosensitive material conveyed by said conveying device at the time the image is read by said reading device; and
a control device for controlling said conveying device such that the photographic photosensitive material is conveyed at the conveying speed determined by said determining means;
wherein said determining means determines a reading period of time of said reading device at which the image can be read properly, on the basis of the conveying speed determined by said determining means.

17. An image reading device according to claim 16, wherein
said conveying device is able to convey the photographic photosensitive material at a first conveying speed and a second conveying speed,
said reading device is able to read the image of the photographic photosensitive material for a first reading period of time and a second reading period of time, and
on the basis of a density of the image at the time the image of the photographic photosensitive material conveyed by said conveying device at the first conveying speed is read by said reading device for the first reading period of time, said determining means determines whether or not the image can be read properly, and in a case in which said determining means determines that the image cannot be read properly, said determining means determines the second conveying speed to be the conveying speed at which the image can be read properly.

18. An image reading device comprising:
a conveying device for conveying a photographic photosensitive material on which an image is recorded;
a reading device for reading the image of the photographic photosensitive material conveyed by said conveying device;
determining means for determining a reading period of time of said reading device at which the image can be read properly, on the basis of a density of the image of the photographic photosensitive material conveyed by said conveying device at the time the image is read by said reading device; and
a control device for controlling said reading device such that the image of the photographic photosensitive material is read for the reading period of time determined by said determining means;
wherein said determining means determines the reading period of time of said reading device, on the basis of a conveying speed of the photographic photosensitive material at which the image can be read properly.

19. An image reading device according to claim 18, wherein
on the basis of the density of the image, said determining means also determined a conveying speed of the photographic photosensitive material, and
said control device also controls said conveying device such that the photographic photosensitive material is conveyed at the conveying speed determined by said determining means.

20. An image reading device according to claim 18, wherein
said conveying device is able to convey the photographic photosensitive material at a first conveying speed and a second conveying speed;
said reading device is able to read the image of the photographic photosensitive material for a first reading period of time and a second reading period of time; and
on the basis of a density of the image at the time the image of the photographic photosensitive material conveyed by said conveying device at the first conveying speed is read by said reading device for the first reading period of time, said determining means determines whether or not the image can be read properly, and in a case in which said determining means determines that the image cannot be read properly, said determining means determines the second reading period of time to be the reading period of time at which the image can be read properly.

21. An image reading device comprising:
a conveying device able to convey a photographic photosensitive material, on which an image is recorded, at a first conveying speed and a second conveying speed which is slower than the first conveying speed;
a reading device able to read the image of the photographic photosensitive material, which is conveyed by said conveying device for a first reading period of time and a second reading period of time which is longer than the first reading period of time;
reading determining means for determining whether or not the image can be read properly, on the basis of a density of the image at the time the image of the photographic photosensitive material conveyed by said conveying device at the first conveying speed is read by said reading device for the first reading period of time;

a control device for, in a case in which said reading determining means determines that the image cannot be read properly, carrying out at least one of a first control, in which said conveying device is controlled to convey the photographic photosensitive material at the second conveying speed, and a second control, in which said reading device is controlled to read the image of the photographic photosensitive material for the second reading period of time; and detecting means for detecting a type of the photographic photosensitive material;

wherein said conveying device determines the first conveying speed in accordance with the type of the photographic photosensitive material detected by said detecting means, and said reading device determines the first reading period of time in accordance with the type of the photographic photosensitive material detected by said detecting means.

22. An image reading device comprising:

a conveying device able to convey a photographic photosensitive material, on which an image is recorded, at a first conveying speed and a second conveying speed which is slower than the first conveying speed;

a reading device able to read the image of the photographic photosensitive material, which is conveyed by said conveying device, for a first reading period of time and a second reading period of time which is longer than the first reading period of time;

reading determining means for determining whether or not the image can be read properly, on the basis of a density of the image at the time the image of the photographic photosensitive material conveyed by said conveying device at the first conveying speed is read by said reading device for the first reading period of time; and a control device for, in a case in which said reading determining means determines that the image cannot be read properly, carrying out at least one of a first control, in which said conveying device is controlled to convey the photographic photosensitive material at the second conveying speed, and a second control, in which said reading device is controlled to read the image of the photographic photosensitive material for the second reading period of time;

wherein the second conveying speed is determined on the basis of the difference between:
  the amount of light which is necessary for properly reading the image and which is determined on the basis of the density of the image, and
  the amount of light at the time the image of the photographic photosensitive material conveyed by said conveying means at the first conveying speed is read by said reading means for the first reading period of time.

23. An image reading method comprising the steps of:

reading an image of a photographic photosensitive material at a first reading period of time while the photographic photosensitive material is conveyed at a first conveying speed;

determining, on the basis of a density of the image obtained by said reading, whether or not the image can be properly read; and in a case in which it is determined that the image cannot be properly read, effecting at least one of a first control, in which the photographic photosensitive material is conveyed at a second conveying speed which is slower than the first conveying speed, arid a second control, in which the image of the photographic photosensitive material is read for a second reading period of time which is longer than the first reading period of time;

wherein a type of the photographic photosensitive material is detected, and the first conveying speed is determined in accordance with the detected type of the photographic photosensitive material, and the first reading period of time is determined in accordance with the detected type of the photographic photosensitive material.

24. An image reading method comprising the steps of:

reading an image of a photographic photosensitive material at a first reading period of time while the photographic photosensitive material is conveyed at a first conveying speed;

determining, on the basis of a density of the image obtained by said reading, whether or not the image can be properly read; and in a case in which it is determined that the image cannot be properly read, effecting at least one of a first control, in which the photographic photosensitive material is conveyed at a second conveying speed which is slower than the first conveying speed, and a second control, in which the image of the photographic photosensitive material is read for a second reading period of time which is longer than the first reading period of time;

wherein the second conveying speed is determined on the basis of the difference between:
  the amount of light which is necessary for properly reading the image and which is determined on the basis of the density of the image, and
  the amount of light at the time the image of the photographic photosensitive material conveyed by said conveying means at the first conveying speed is read by said reading means for the first reading period of time.

25. An image reading device comprising:

a conveying device for conveying a photographic photosensitive material on which an image is recorded;

an illuminating device for illuminating light onto the photographic photosensitive material;

a reading device for reading the image of the photographic photosensitive material conveyed by said conveying device;

determining means for determining an amount of light which is different than an amount of light illuminated onto the-photographic photosensitive material by said illuminating device at the time the density of the image is determined, and on the basis of said amount of light determined by said determining means, determining a conveying speed at which the image can be read properly; and a control device for controlling said illuminating device such that said amount of light determined by said determining means is illuminated onto the photographic photosensitive material, and controlling said conveying device such that the photographic photosensitive material is conveyed at a conveying speed which is determined on the basis of said amount of light determined by said determining means.

26. An image reading device comprising:

a conveying device for conveying a photographic photosensitive material on which an image is recorded;

an illuminating device for illuminating light onto the photographic photosensitive material;

a reading device for reading the image of the photographic photosensitive material conveyed by said conveying device;

determining means for determining an amount of light which is different than an amount of light illuminated onto the photographic photosensitive material by said illuminating device at the time the density of the image is determined, and on the basis of said amount of light determined by said determining means, determining a reading period of time of said reading device at which the image can be read properly; and a control device for controlling said illuminating device such that said amount of light determined by said determining means is illuminated onto the photographic photosensitive material, and controlling said reading device such that the image of the photographic photosensitive material is read for a reading period of time which is determined on the basis of said amount of light determined by said determining means.

* * * * *